US012804553B2

(12) United States Patent
Guo

(10) Patent No.: US 12,804,553 B2
(45) Date of Patent: Nov. 17, 2026

(54) SELF-INTERFERENCE AVOIDANCE METHOD AND APPARATUS, AND MEASUREMENT RESULT SENDING METHOD AND APPARATUS

(71) Applicant: Beijing Xiaomi Mobile Software Co., Ltd., Beijing (CN)

(72) Inventor: Shengxiang Guo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 335 days.

(21) Appl. No.: 18/716,702

(22) PCT Filed: Dec. 13, 2021

(86) PCT No.: PCT/CN2021/137568
§ 371 (c)(1),
(2) Date: Jun. 5, 2024

(87) PCT Pub. No.: WO2023/108370
PCT Pub. Date: Jun. 22, 2023

(65) Prior Publication Data

US 2025/0048274 A1 Feb. 6, 2025

(51) Int. Cl.
*H04W 52/24* (2009.01)
*H04W 52/14* (2009.01)

(52) U.S. Cl.
CPC ....... *H04W 52/243* (2013.01); *H04W 52/143* (2013.01); *H04W 52/146* (2013.01); *H04W 52/241* (2013.01)

(58) Field of Classification Search
CPC ............. H04W 52/243; H04W 52/143; H04W 52/146; H04W 52/241
See application file for complete search history.

(56) References Cited

U.S. PATENT DOCUMENTS

2013/0044621 A1 2/2013 Jung et al.
2016/0174234 A1* 6/2016 Wang .................... H04W 24/10 370/329

(Continued)

FOREIGN PATENT DOCUMENTS

CN 108289311 A 7/2018
CN 108933610 A 12/2018

(Continued)

OTHER PUBLICATIONS

ISA State Intellectual Property Office of the People's Republic of China, International Search Report Issued in Application No. PCT/CN2021/137568, Sep. 2, 2022, WIPO, 4 pages.

(Continued)

*Primary Examiner* — David Bilodeau
(74) *Attorney, Agent, or Firm* — Finnegan, Henderson, Farabow, Garrett & Dunner, L.L.P.

(57) ABSTRACT

A self-interference avoidance method is performed by a network side device. The method includes: determining a carrier combination with potential self-interference, wherein the carrier combination comprises a first carrier subjected to interference and a second carrier causing interference; sending a downlink reference signal on the first carrier; instructing a terminal to change uplink transmission power on the second carrier; receiving a first measurement result and a second measurement result reported by the terminal, wherein the first measurement result includes a measurement result determined by the terminal by measuring the downlink reference signal before changing the uplink transmission power, and the second measurement result includes a measurement result determined by measuring the downlink reference signal after changing the uplink transmission power; and determining whether to perform self-interference avoidance according to the first measurement result and the second measurement result.

20 Claims, 15 Drawing Sheets

(56) References Cited

U.S. PATENT DOCUMENTS

| | | | | |
|---|---|---|---|---|
| 2019/0082337 | A1 | 3/2019 | Gheorghiu et al. | |
| 2019/0174423 | A1* | 6/2019 | Zhang | H04W 52/146 |
| 2020/0313779 | A1 | 10/2020 | Kim et al. | |
| 2021/0321415 | A1 | 10/2021 | Raghavan et al. | |
| 2022/0124629 | A1* | 4/2022 | Xing | H04W 52/02 |
| 2022/0216976 | A1* | 7/2022 | Zhang | H04B 17/24 |

FOREIGN PATENT DOCUMENTS

| | | | |
|---|---|---|---|
| CN | 112586013 | A | 3/2021 |
| WO | 2015062419 | A1 | 5/2015 |
| WO | 2020214007 | A1 | 10/2020 |

OTHER PUBLICATIONS

OPPO, “Text proposal on RRM measurement,” 3GPP TSG RAN WG1 Meeting AH 1801, R1-1800506, Vancouver, Canada, Jan. 22-26, 2018, 3 pages.

Extended European Search Report Issued in Application No. 21967512.1 dated Sep. 23, 2025, 11 pages.

State Intellectual Property Office of the People’s Republic of China, Office Action and Search Report Issued in Application No. 2021800044402, Jun. 30, 2025, 20 pages.

ISA State Intellectual Property Office of the People’s Republic of China, Written Opinion of the International Searching Authority Issued in Application No. PCT/CN2021/137568, Sep. 2, 2022, WIPO, 7 pages.

* cited by examiner

SELF-INTERFERENCE AVOIDANCE METHOD AND APPARATUS, AND MEASUREMENT RESULT SENDING METHOD AND APPARATUS

CROSS-REFERENCE TO RELATED APPLICATION

The present application is a U.S. National Stage of International Application No. PCT/CN2021/137568, filed on Dec. 13, 2021, the contents of which are incorporated herein by reference in their entirety.

TECHNICAL FIELD

The present disclosure relates to the field of communication technologies, in particular to self-interference avoidance methods, measurement result sending methods, self-interference avoidance apparatuses, measurement result sending apparatuses, communication apparatuses and computer-readable storage media.

BACKGROUND

In wireless communication systems, in order to improve transmission rate and system capacity, multi-carrier technologies, such as a carrier aggregation technology and a dual connectivity technology, are widely used.

However, when multi-carrier transmission is implemented by some carrier combinations, there may be some self-interference problems, such as harmonic interference, neighboring channel interference, intermodulation interference, etc. The larger the interference, the larger the downlink sensitivity loss. To ensure performance of multi-carrier applications, protocols specify that the sensitivity loss cannot exceed a certain threshold.

When the threshold is exceeded, a network side needs to adopt a corresponding policy to avoid serious influence on a communication process, but there are some problems with the policy adopted by the network side device at present.

SUMMARY

In view of this, embodiments of the present disclosure provide self-interference avoidance methods, measurement result sending methods, self-interference avoidance apparatuses, measurement result sending apparatuses, communication apparatuses and computer-readable storage media to solve technical problems in related technologies.

According to a first aspect of an embodiment of the present disclosure, a self-interference avoidance method is performed by a network side device, and the method includes: determining a carrier combination with potential self-interference, where the carrier combination includes a first carrier subjected to interference and a second carrier causing interference; sending a downlink reference signal on the first carrier; instructing a terminal to change uplink transmission power on the second carrier; receiving a first measurement result and a second measurement result reported by the terminal, where the first measurement result includes a measurement result determined by the terminal by measuring the downlink reference signal before changing the uplink transmission power, and the second measurement result includes a measurement result determined by measuring the downlink reference signal after changing the uplink transmission power; and determining whether to perform self-interference avoidance according to the first measurement result and the second measurement result.

According to a second aspect of an embodiment of the present disclosure, a measurement result sending method is performed by a terminal, and the method includes: receiving a downlink reference signal on a first carrier which is configured in a carrier combination by a network side device; changing uplink transmission power on a second carrier in the carrier combination according to an instruction of the network side device; determining a first measurement result by measuring the downlink reference signal before changing the uplink transmission power, and determining a second measurement result by measuring the downlink reference signal after changing the uplink transmission power; and sending the first measurement result and the second measurement result to the network side device.

According to a third aspect of an embodiment of the present disclosure, a communication apparatus is provided, including: a processor; a memory for storing a computer program; where, when the computer program is executed by the processor, the processor is configured to: determine a carrier combination with potential self-interference, where the carrier combination includes a first carrier subjected to interference and a second carrier causing interference; send a downlink reference signal on the first carrier; instruct a terminal to change uplink transmission power on the second carrier; receive a first measurement result and a second measurement result reported by the terminal, where the first measurement result includes a measurement result determined by the terminal by measuring the downlink reference signal before changing the uplink transmission power, and the second measurement result includes a measurement result determined by measuring the downlink reference signal after changing the uplink transmission power; and determine whether to perform self-interference avoidance according to the first measurement result and the second measurement result.

BRIEF DESCRIPTION OF DRAWINGS

In order to more clearly illustrate technical solutions in embodiments of the present disclosure, a brief introduction will be given below to the accompanying drawings required in the description of the embodiments. It is evident that the accompanying drawings in the following description are only examples of embodiments of the present disclosure.

DETAILED DESCRIPTION

Figure 1:
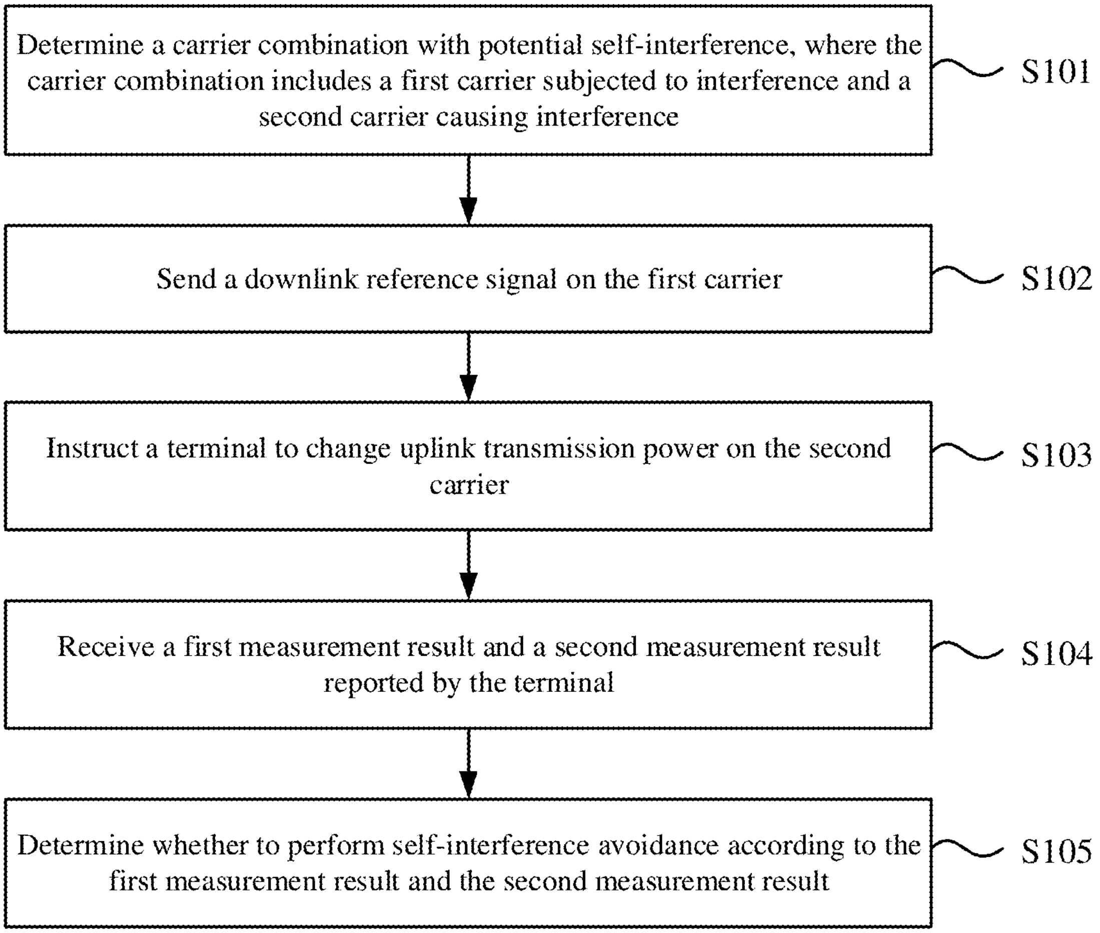
FIG. 1 is a schematic flowchart of a self-interference avoidance method according to an embodiment of the present disclosure.

The technical solutions in the embodiments of the present disclosure will be clearly and completely described below in conjunction with the accompanying drawings in the embodiments of the present disclosure. Obviously, the described embodiments are only a part of the embodiments of the present disclosure, not the whole embodiments. Based on the embodiments in the present disclosure, all other embodiments obtained by those of ordinary skills in the art without making creative efforts belong to the protection scope of the present disclosure.

Terms used in embodiments of the present disclosure are only for a purpose of describing specific embodiments, and are not limiting the embodiments of the present disclosure. Singular forms of "a", said", and "the" used in the embodiments of the present disclosure and in the claims are also intended to include majority forms, unless the context clearly indicates otherwise. It should also be understood that the term "and/or" as used herein refers to any or all of the possible combinations containing one or more of the listed items in association.

It should be understood that although terms first, second, third, etc. may be used to describe various information in the embodiments of the present disclosure, these information should not be limited to these terms. These terms are used only to distinguish the same type of information from one another. For example, without departing from the scope of the present disclosure, first information can also be named as second information, and similarly, the second information can also be named as the first information. Depending on the context, the word "if" as used herein can be interpreted as "at" or "when" or "in response to determining".

For the purpose of simplicity and ease of understanding, the terms used in the present disclosure to represent size relationships are "greater than" or "less than", "higher than" or "lower than". But for those skilled in the art, it can be understood that the term "greater than" also covers the meaning of "greater than or equal to" and "less than" also covers the meaning of "less than or equal to". The term "higher than" covers the meaning of "higher than or equal to" and "lower than" also covers the meaning of "lower than or equal to".

In related technologies, a network side device can configure a carrier combination for a terminal, including multiple carriers, and the terminal and the network side device can communicate through multiple carriers in the carrier combination. However, when communicating through multiple carriers, a problem of self-interference may occur between carriers, for example, an uplink communication on one carrier will cause interference to a downlink communication on another carrier.

Self-interference will cause downlink sensitivity loss. In order to ensure the performance of multi-carrier applications, the protocol stipulates that the sensitivity loss cannot exceed a certain threshold. If it exceeds this threshold, the network side device needs to adopt corresponding strategies. Besides sensitivity loss, the degree of self-interference can also be measured according to other indicators.

The current way of determining self-interference for the network side device is to first determine whether there is potential self-interference on the carrier combination configured to the terminal. If there is no potential self-interference, then the terminal can be scheduled as configured, and if there is potential self-interference, it is necessary to determine whether the degree of self-interference is acceptable.

Firstly, the network side device instructs the terminal to deactivate uplink transmission, and the terminal deactivates the uplink transmission according to the instruction. Then, the network side device sends a downlink reference signal (RS), and the terminal determines power on the received downlink reference signal. Next, the network side device instructs the terminal to activate uplink transmission, the terminal activates the uplink transmission according to the instruction, and the network side device stops sending the downlink reference signal. Further, the terminal measures self-interference power, obtains a signal-to-interference ratio (SIR), and reports it to the network side device. The network side device determines whether the signal-to-interference ratio is acceptable. If it is acceptable, the terminal can be scheduled as configured. If it is not acceptable, resources need to be rescheduled for the terminal to alleviate the self-interference problem.

However, the problem in the above process is that the network side device needs to instruct the terminal to deactivate the uplink transmission, which will lead to an interruption of a communication process of the terminal and affect the communication effect.

FIG. 1 is a schematic flowchart of a self-interference avoidance method according to an embodiment of the present disclosure. The self-interference avoidance method shown in this embodiment can be performed by a network side device, the network side device includes but is not limited to a network side device in a communication system such as 4G, 5G, 6G, etc., such as a base station and a core network, the network side device may be in communication with a terminal, the terminal including but not limited to a communication apparatus such as a cell phone, a tablet computer, a wearable device, a sensor, an IoT device, etc.

As shown in FIG. 1, the self-interference avoidance method may include the following steps.

At step S101, a carrier combination with potential self-interference is determined, where the carrier combination includes a first carrier subjected to interference and a second carrier causing interference. The carrier which is subject to interference refers to a downlink carrier, and the carrier that causes interference refers to an uplink carrier.

At step S102, a downlink reference signal is sent on the first carrier.

At step S103, a terminal is instructed to change uplink transmission power on the second carrier.

At step S104, a first measurement result and a second measurement result reported by the terminal are received, where the first measurement result is a measurement result determined by the terminal by measuring the downlink reference signal before changing the uplink transmission power, and the second measurement result is a measurement result determined by measuring the downlink reference signal after changing the uplink transmission power.

At step S105, it is determined whether to perform self-interference avoidance according to the first measurement result and the second measurement result.

In an embodiment, the network side device can configure a carrier combination containing multiple carriers for the terminal, and then can communicate with the terminal through multiple carriers in the carrier combination.

The network side device can determine whether there is potential self-interference (also referred as potential interference) in the carrier combination according to a relationship between the corresponding frequencies of each of the multiple carriers. For example, a list of carrier combinations with potential self-interference may be predetermined, and then whether the carrier combination configured to the terminal has potential self-interference can be determined by looking up the table. For example, it can also be calculated and determined whether there is potential self-interference in a carrier combination configured to the terminal by the following manner.

First, the following two equations can be constructed:

$$f_{INT} = a \times f_{TX1} + b \times f_{RX1} + c \times f_{TX2} + d \times f_{RX2};$$

$$BW_{INT} = a \times CBW_{TX1} + c \times CBW_{TX2};$$

where $f_{INT}$ is an interference center frequency, $BW_{INT}$ is an effective bandwidth corresponding to $f_{INT}$, $f_{TX1}$ is a frequency of uplink carrier ($f_{TX1}$) corresponding to a first frequency band in a frequency band combination and $f_{RX1}$ is a frequency of downlink carrier ($f_{RX1}$) corresponding to the first frequency band in the frequency band combination, $f_{TX2}$ is a frequency of uplink carrier ($f_{TX2}$) corresponding to a second frequency band in the frequency band combination and $f_{RX2}$ is a frequency of downlink carrier ($f_{RX2}$) corresponding to the second frequency band in the frequency band combination, and $CBW_{TX1}$ and $CBW_{TX2}$ are channel bandwidths corresponding to the above two uplink carriers.

Based on the above two equations, coefficients a, b, c, and d can be traversed within a certain range. For example, if one value of coefficient b and coefficient d is 0 and the other value is 1, a sum of an absolute value of coefficient a and an absolute value of coefficient c is less than or equal to 6. The sum of the absolute value of a and the sum of the coefficient c can represent a harmonic order or an intermodulation order.

Traverse the coefficients a, b, c and d to judge whether the following two inequalities hold;

$$|f_{INT}| < (BW_{INT} + CBW_{RX1})/2;$$

$$|f_{INT}| < (BW_{INT} + CBW_{RX2})/2;$$

where $CBW_{RX1}$ and $CBW_{RX2}$ are channel bandwidths corresponding to the above two downlink carriers.

If the inequality $|f_{INT}|<(BW_{INT}+CBW_{RX1})/2$ holds, it can be determined that $BW_{INT}$ and $CBW_{RX1}$ overlap and the downlink carrier in the first frequency band is interfered.

If the inequality $|f_{INT}|<(BW_{INT}+CBW_{RX2})/2$ holds, it can be determined that $BW_{INT}$ and $CBW_{RX2}$ overlap and the downlink carrier in the second frequency band is interfered.

For example, in the case that the first frequency band is band-20 and the second frequency band is band-n41, it is determined that under the three coefficient combinations shown in Table 1 below, there is an interfered frequency band, i.e., there is potential self-interference.

TABLE 1

| Carrier combination | Frequency band | Uplink coefficient a and c | | Downlink coefficient b and d | | Harmonic or intermodulation order | Frequency band subjected to interference | Interference type |
|---|---|---|---|---|---|---|---|---|
| DC_20A_n41A | 20 | a | 3 | b | 0 | 3 | n41 | Harmonic |
| | n41 | c | 0 | d | −1 | | | |
| DC_20A_n41A | 20 | a | −2 | b | −1 | 3 | 20 | Intermodulation |
| | n41 | c | 1 | d | 0 | | | |
| DC_20A_n41A | 20 | a | 4 | b | −1 | 5 | 20 | Intermodulation |
| | N41 | c | −1 | d | 0 | | | |

If it is determined that there is no potential self-interference, the terminal can be normally scheduled to communicate according to a configuration on the carrier combination. If it is determined that there is potential self-interference, steps S102 to S104 can be performed.

In an embodiment, when the network side device determines a carrier combination with potential self-interference, the first carrier affected by interference and the second carrier causing interference in the carrier combination can be determined. The first carrier can be one carrier or multiple carriers, and similarly, the second carrier can be one carrier or multiple carriers.

After determining the first carrier which is subject to interference and the second carrier which is causing the interference, the network side device may send a downlink reference signal on the first carrier, which may in turn instruct the terminal to change uplink transmission power on the second carrier, thereby enabling the terminal to determine a first measurement result by measuring the downlink reference signal before changing the uplink transmission power, to determine a second measurement result by measuring the downlink reference signal after changing the uplink transmission power, and to report the first measurement result and the second measurement result to the network side device, so that the network side device can determine whether to perform self-interference avoidance according to the first measurement result and the second measurement result.

Changing the uplink transmission power can be to increase the uplink transmission power or to reduce the uplink transmission power, and a magnitude of changing the uplink transmission power may be indicated by the network side device or may be determined by a protocol agreement. There may be various forms of the measurement result, and how the terminal determines the measurement result will be explained in the following embodiments.

According to the embodiment of the present disclosure, the network side device determines whether to perform self-interference avoidance according to the first measurement result and the second measurement result reported by the terminal, and only needs to instruct the terminal to change the uplink transmission power without deactivating uplink transmission of the terminal in this process, so that a communication process of the terminal will not be interrupted, which is beneficial to ensuring a good communication effect.

It should be noted that the network side device determines whether to perform self-interference avoidance according to the first measurement result and the second measurement result, which mainly includes two situations. One is to determine that the degree of self-interference is relatively strong according to the first measurement result and the second measurement result, so self-interference avoidance is performed, and the other is to determine that the degree of self-interference is relatively weak according to the first measurement result and the second measurement result, so self-interference avoidance is not performed.

Figure 2:
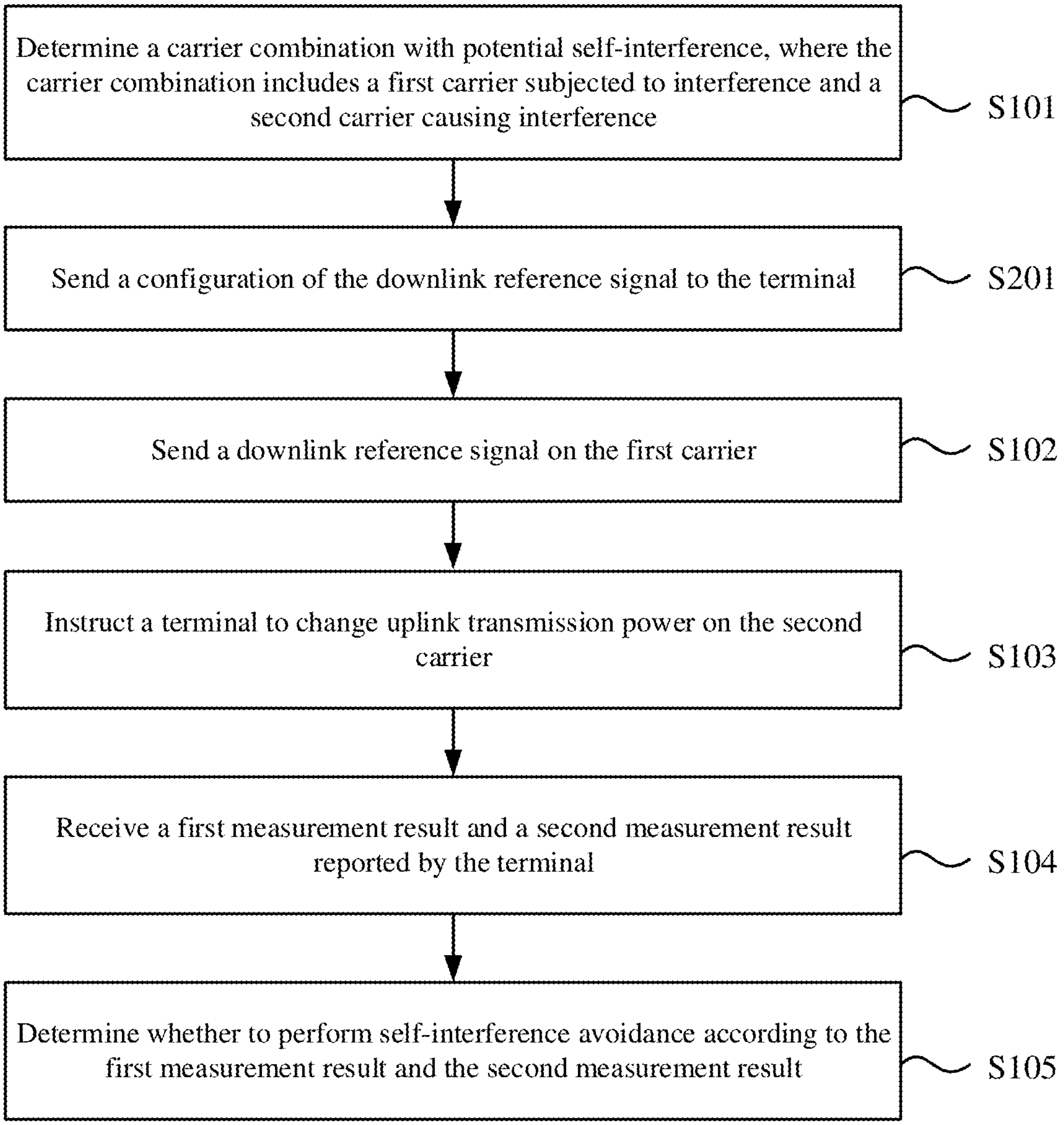
FIG. 2 is a schematic flowchart of another self-interference avoidance method according to an embodiment of the present disclosure.

FIG. 2 is a schematic flowchart of another self-interference avoidance method according to an embodiment of the present disclosure. As shown in FIG. 2, before sending the downlink reference signal on the first carrier, the method further includes the following steps.

At step S201, a configuration of the downlink reference signal is sent to the terminal.

In an embodiment, when the network side device determines a frequency band combination with potential self-interference, it can send the configuration of the downlink reference signal to the terminal, so that when the terminal receives the configuration, it determines that the measurement result needs to be determined, and then receives the downlink reference signal according to the configuration.

In an embodiment, sending a configuration of the downlink reference signal to the terminal includes:

sending the configuration of the downlink reference signal to the terminal in response to the terminal being capable of determining and reporting the first measurement result and the second measurement result.

In an embodiment, due to different capabilities of different terminals, some terminals have the capability to determine and report the first measurement result and the second measurement result, while others have no capability to determine the measurement result or report the first measurement result and the second measurement result. If configuration information of downlink reference signal is sent to a terminal that has no capability to determine the first measurement result and the second measurement result, or to report the first measurement result and the second measurement result, the terminal cannot determine and report the first measurement result and the second measurement result, which will lead to wasted overhead.

Therefore, before sending the configuration of the downlink reference signal to the terminal, the network side device can further receive capability indication information reported by the terminal, determine whether the terminal has the capability to determine and report the first measurement result and the second measurement result according to the capability indication information, and send the configuration information of the downlink reference signal to the terminal only after determining that the terminal is capable of determining and reporting the first measurement result and the second measurement result, which will cause the terminal to receive the downlink reference signal according to the configuration and attempt to determine the first measurement result and the second measurement result, as well as report the first measurement result and the second measurement result. When it is determined that the terminal is incapable of determining and reporting the first measurement result and the second measurement result, it is not necessary to send the configuration information of the downlink reference signal to the terminal, which will not cause the terminal to receive the downlink reference signal according to the configuration and attempt to determine the first measurement result and the second measurement result, thus avoiding wasted overhead.

In an embodiment, the way of performing self-interference avoidance includes at least one of the following:

- instructing the terminal to communicate on a carrier combination other than the carrier combination;
- instructing the terminal that a configuration of the carrier combination is cancelled;
- instructing the terminal to reduce the uplink transmission power on the second carrier; or
- increasing downlink transmission power on the first carrier.

In an embodiment, the degree of self-interference is mainly related to the uplink transmission power, for example, the greater the uplink transmission power, the stronger the degree of self-interference, and the smaller the uplink transmission power, the weaker the degree of self-interference.

Therefore, when the network side device determines that the degree of self-interference is relatively strong according to the first measurement result and the second measurement result, and self-interference avoidance is needed, it can instruct the terminal to reduce the uplink transmission power on the second carrier, thereby reducing the self-interference on a downlink reception of the first carrier, which is beneficial to obtaining good communication effect.

In addition, the network side device can perform self-interference avoidance by increasing the downlink transmission power on the first carrier, so even the uplink transmission of the second carrier will still cause interference to the downlink reception of the first carrier, but because the downlink transmission power on the first carrier is increased, which is equivalent to an improvement of signal-to-noise ratio under the condition that other conditions remain unchanged (such as the uplink transmission power is unchanged), which is conducive to obtaining good communication effects.

Since the carrier combination has a self-interference problem, the network side device can perform self-interference avoidance by instructing the terminal to communicate on a carrier combination other than the carrier combination, for example, on other carrier combinations without potential self-interference, and good communication effect can also be obtained. Or, the network side device can instruct the terminal that a configuration of the carrier combination is cancelled, then the terminal can stop communicating on the carrier combination, and poor communication quality can be avoided to a certain extent.

The first measurement result and the second measurement result are described by several embodiments.

Figure 3:
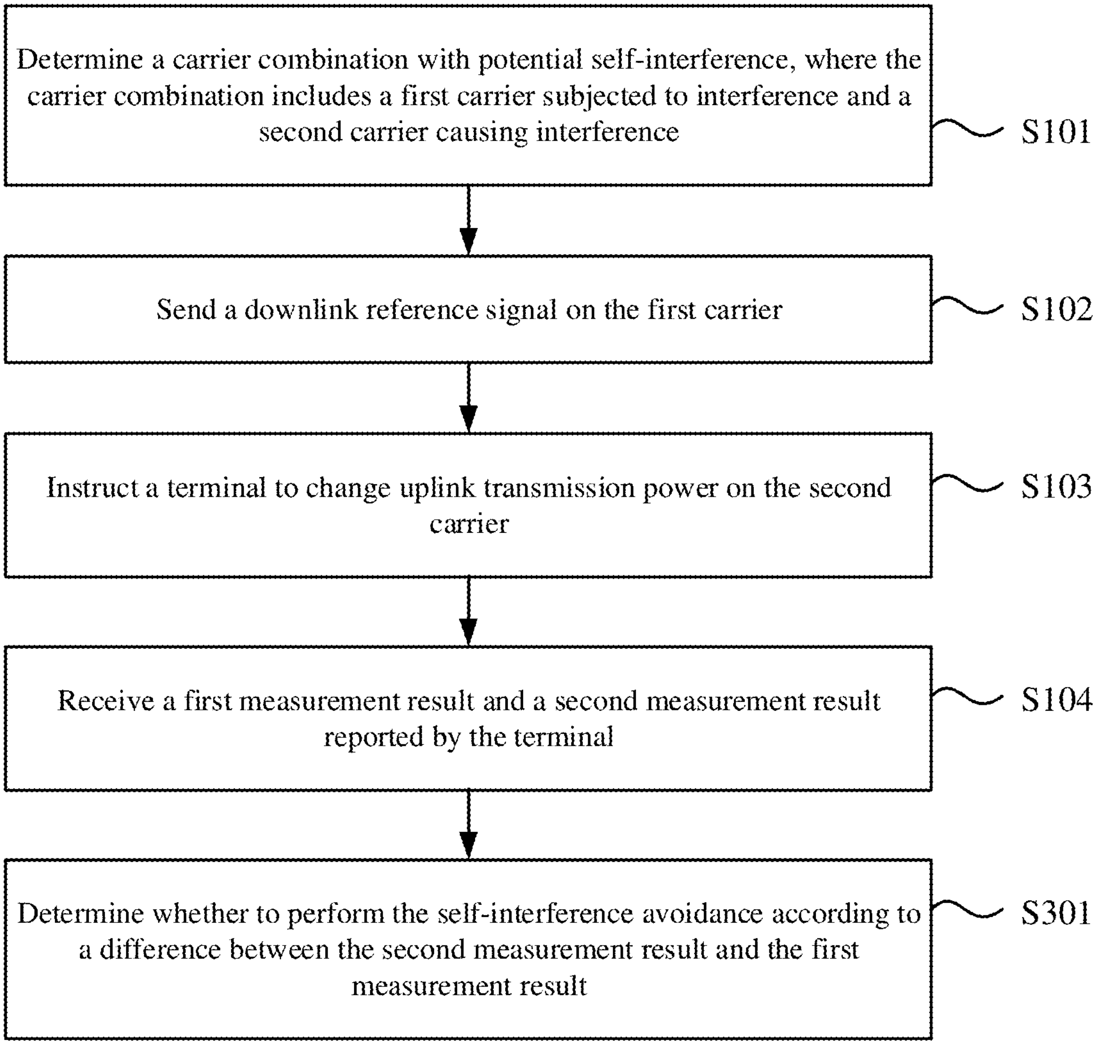
FIG. 3 is a schematic flowchart of yet another self-interference avoidance method according to an embodiment of the present disclosure.

FIG. 3 is a schematic flowchart of yet another self-interference avoidance method according to an embodiment of the present disclosure. As shown in FIG. 3, receiving the measurement results determined by the terminal based on the uplink transmission power before the change, the uplink transmission power after the change and the downlink reference signal, and determining whether to perform self-interference avoidance according to the first measurement result and the second measurement result includes the following steps.

At step S301, it is determined whether to perform the self-interference avoidance according to a difference between the second measurement result and the first measurement result.

In an embodiment, by sending configuration information to the terminal, the network side device can enable the terminal to receive a downlink reference signal according to the configuration information, and determine a first measurement result by measuring the reference signal before changing the uplink transmission power, as well as determine a second measurement result by measuring the reference signal after changing the uplink transmission power. The network side device can then receive the first measurement result and the second measurement result, and determine whether to perform self-interference avoidance based on a difference between the second measurement result and the first measurement result.

The difference between the second measurement result and the first measurement result can be calculated by the terminal and reported to the network side device, or the terminal can report the first measurement result and the second measurement result first, and the network side device can calculate the difference according to the first measurement result and the second measurement result, for example, by subtracting the first measurement result from the second measurement result.

In an embodiment, the first measurement result includes a first received signal strength indication (RSSI), for example notated as RSSI_1, and the second measurement result includes a second RSSI, for example notated as RSSI_2, so the difference between the second measurement result and the first measurement result is the second RSSI minus the first RSSI (RSSI_2−RSSI_1).

Or, the first measurement result includes a first reference signal receiving quality (RSRQ), for example notated as RSRQ_1, and the second measurement result includes a second RSRQ, for example notated as RSRQ_2, so the difference between the second measurement result and the first measurement result is the second RSRQ minus the first RSRQ (RSRQ_2−RSRQ_1).

In an embodiment, determining whether to perform the self-interference avoidance according to a difference between the second measurement result and the first measurement result includes: performing the self-interference avoidance when the difference is greater than a first threshold, and not performing the self-interference avoidance when the difference is less than or equal to the first threshold.

In an embodiment, the network side device can compare the difference between the second measurement result and the first measurement result with a first threshold, taking RSRQ as an example of the measurement result, the difference (RSRQ_2−RSRQ_1) reflects a change degree of RSRQ before and after the change of uplink transmission power. If the difference (RSRQ_2−RSRQ_1) is greater than the first threshold, it means that RSRQ changes greatly with the change of uplink transmission power, so RSRQ is greatly affected by uplink transmission power, so it can be judged that the degree of self-interference caused by uplink transmission power is strong, and then self-interference avoidance can be performed.

Accordingly, if the difference (RSRQ_2−RSRQ_1) is less than or equal to the first threshold, it means that RSRQ changes little with the change of uplink transmission power, so RSRQ is less affected by uplink transmission power, so it can be judged that the degree of self-interference caused by uplink transmission power is weak, and then self-interference avoidance may not be performed. Subsequently, the communication of terminal can be scheduled normally according to the configuration on the frequency/carrier combination.

Figure 4:
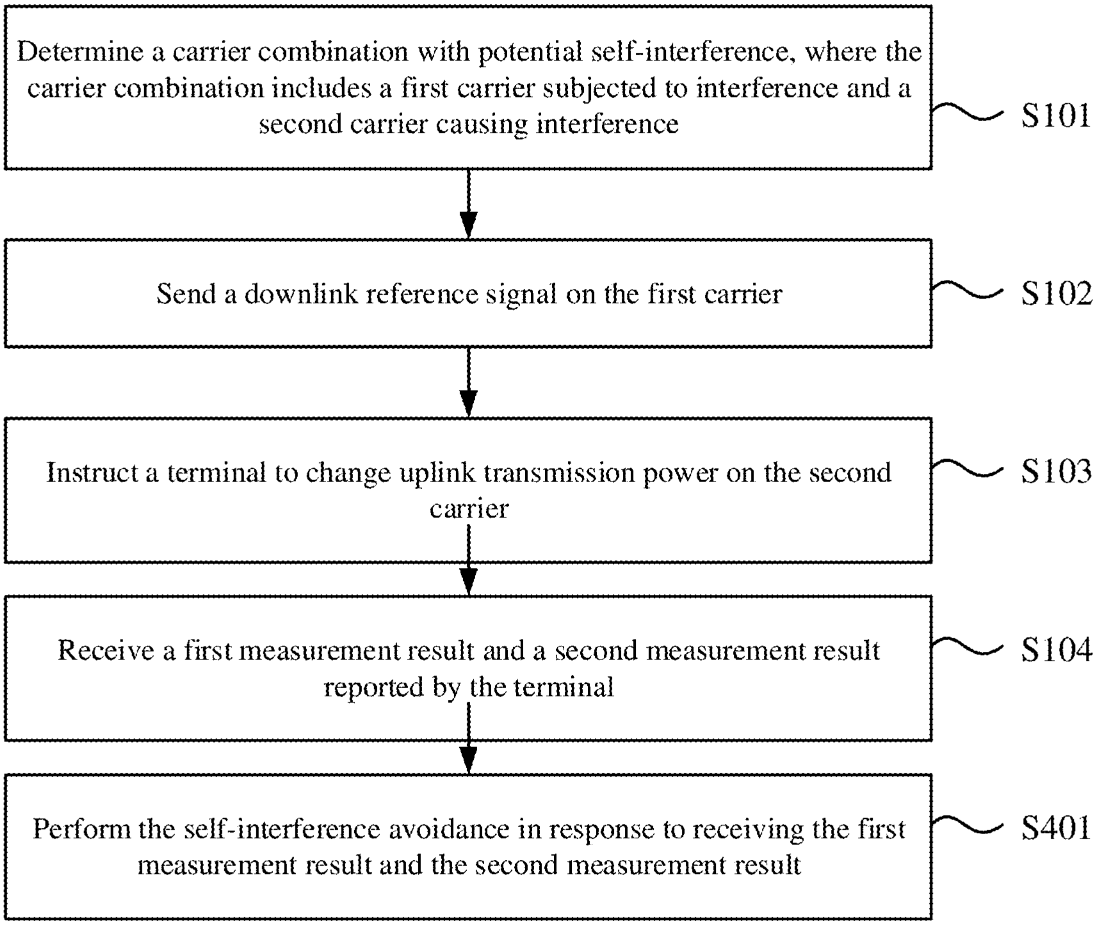
FIG. 4 is a schematic flowchart of yet another self-interference avoidance method according to an embodiment of the present disclosure.

FIG. 4 is a schematic flowchart of yet another self-interference avoidance method according to an embodiment of the present disclosure. As shown in FIG. 4, determining whether to perform self-interference avoidance according to the first measurement result and the second measurement result includes the following steps.

At step S401, the self-interference avoidance is performed in response to receiving the first measurement result and the second measurement result.

In an embodiment, by sending the configuration information of the downlink reference signal to the terminal, the network side device can enable the terminal to determine the first measurement result by measuring the downlink reference signal before changing the uplink transmission power and to determine the second measurement result by measuring the downlink reference signal after changing the uplink transmission power, and to determine a correlation between the first measurement result and the second measurement result with the uplink transmission power.

The correlation may represent the interference of uplink transmission on downlink reception. When the correlation satisfies a preset relationship, it may be determined that the uplink transmission has a greater impact on downlink reception, and therefore the degree of self-interference is relatively greater, and thus the first measurement result and the second measurement result are sent to the network side device when the correlation satisfies the preset relationship.

The preset relationship includes a positive correlation and/or a negative correlation, for example, the preset relationship is the positive correlation, and the terminal can send the first measurement result and the second measurement result to the network side device if the correlation is determined to be positive correlation, and not send the first measurement result and the second measurement result to the network side device if the correlation is determined to be negative correlation. In an embodiment, the measurement result includes at least one of the following: a difference between RSSI and reference signal receiving power (RSRP); or an RSRQ.

The terminal can determine a measurement result by measuring the downlink reference signal before changing the uplink transmission power, for example, named as a first measurement result, and then determine a measurement result by measuring the downlink reference signal after changing the uplink transmission power, for example, named as a second measurement result, and then determine the correlation according to the first measurement result and the second measurement result.

In an embodiment, for example, a measurement result is a difference between RSSI and RSRP. The first measurement result is a difference between RSSI and RSRP determined according to the downlink reference signal before the terminal changes the uplink transmission power, for example, named as a first difference (for example, notated as RSSI_1–RSRP_1), and the second measurement result is a difference between RSSI and RSRP determined according to the downlink reference signal after the terminal changes the uplink transmission power, for example, named as a second difference (for example, notated as RSSI_2–RSRP_2). The difference between RSSI and RSRP (RSSI-RSRP) can represent the degree of self-interference. If the difference between RSSI and RSRP (RSSI-RSRP) is large, the degree of self-interference is large, and if the difference between RSSI and RSRP (RSSI-RSRP) is small, the degree of self-interference is small.

In the case of changing the uplink transmission power to reduce the uplink transmission power, if the first difference is greater than the second difference, e.g., (RSSI_1–RSRP_1)>(RSSI_2–RSRP_2), which indicates that the degree of self-interference is reduced with the reduction of the uplink transmission power, the first measurement result and the second measurement result are positively correlated with the uplink transmission power.

Accordingly, if the first difference is less than the second difference, e.g., (RSSI_1–RSRP_1)<(RSSI_2–RSRP_2), which indicates that the degree of self-interference is increased with the reduction of the uplink transmission power, the first measurement result and the second measurement result are negatively correlated with the uplink transmission power.

However, if the first difference is equal to the second difference, e.g., (RSSI_1–RSRP_1)=(RSSI_2–RSRP_2), which indicates that the degree of self-interference is not affected with the reduction of the uplink transmission power, the first measurement result and the second measurement result are irrelevant with the uplink transmission power.

In the case of changing the uplink transmission power to increase the uplink transmission power, if the first difference is less than the second difference, e.g., (RSSI_1–RSRP_1)<(RSSI_2–RSRP_2), which indicates that the degree of self-interference is increased with the increase of the uplink transmission power, the first measurement result and the second measurement result are positively correlated with the uplink transmission power.

Accordingly, if the first difference is greater than the second difference, e.g., (RSSI_1–RSRP_1)>(RSSI_2–RSRP_2), which indicates that the degree of self-interference is reduced with the increase of the uplink transmission power, the first measurement result and the second measurement result are negatively correlated with the uplink transmission power.

However, if the first difference is equal to the second difference, e.g., (RSSI_1–RSRP_1)=(RSSI_2–RSRP_2), which indicates that the degree of self-interference is not affected with the increase of the uplink transmission power, the first measurement result and the second measurement result are irrelevant with the uplink transmission power.

It can be seen that in the case that the first measurement result is (RSSI_1–RSRP_1) and the second measurement result is (RSSI_2–RSRP_2), the preset relationship can be a positive correlation. Therefore, when the terminal determines that there is a positive correlation between the first measurement result and the second measurement result with the uplink transmission power, it can determine that the degree of self-interference caused by the uplink transmission power is strong, so as to report the first measurement result and the second measurement result to the network side device, and the network side device can determine that the degree of self-interference caused by the uplink transmission power is strong after receiving the first measurement result and the second measurement result, so as to perform self-interference avoidance.

Further, in the case that the preset relationship is positively correlated, the preset relationship may be a positive preset coefficient. The correlation can be a relationship coefficient representing a relationship between the first measurement result and the second measurement result and the uplink transmission power. If the relationship coefficient is greater than the preset coefficient, it indicates that the interference caused by the uplink carrier to the downlink carrier is relatively serious, and the terminal reports the first measurement result and the second measurement result to the network side device.

In an embodiment, for example, the measurement result is RSRQ, the first measurement result is an RSRQ determined before the terminal changes the uplink transmission power, for example referred to as a third RSRQ, and the second measurement result is an RSRQ determined after the terminal changes the uplink transmission power, for example referred to as a fourth RSRQ, RSRQ may represent the degree of self-interference. If the RSRQ is large, the degree of self-interference is small, and if the RSRQ is small, the degree of self-interference is large.

In the case of changing the uplink transmission power to reduce the uplink transmission power, if the third RSRQ is less than the fourth RSRQ, it means that the RSRQ becomes larger with the reduction of the uplink transmission power, and therefore the degree of self-interference is reduced, the first measurement result and second measurement result are negatively correlated with the uplink transmission power, which indicates that the uplink carrier interferes with the downlink carrier.

Accordingly, if the third RSRQ is greater than the fourth RSRQ, it means that the RSRQ becomes smaller with the reduction of the uplink transmission power, so the degree of self-interference increases, the first measurement result and second measurement result are positively correlated with the uplink transmission power, which indicates that there is no interference of the uplink carrier to the downlink carrier.

However, if the third RSRQ is equal to the fourth RSRQ, it means that the degree of self-interference is not affected with the reduction of the uplink transmission power, the first measurement result and the second measurement result are irrelevant with the uplink transmission power, which indicates that there is no interference of the uplink carrier to the downlink carrier.

In the case of changing the uplink transmission power to increase the uplink transmission power, if the third RSRQ is greater than the fourth RSRQ, it means that the RSRQ becomes smaller with the increase of the uplink transmission power, and therefore the degree of self-interference is increased, the first measurement result and second measurement result are negatively correlated with the uplink transmission power, which indicates that the uplink carrier interferes with the downlink carrier.

Accordingly, if the third RSRQ is less than the fourth RSRQ, it means that the RSRQ becomes larger with the increase of the uplink transmission power, so the degree of self-interference is reduced, the first measurement result and second measurement result are positively correlated with the uplink transmission power, which indicates that there is no interference of the uplink carrier to the downlink carrier.

However, if the third RSRQ is equal to the fourth RSRQ, it means that the degree of self-interference is not affected with the increase of the uplink transmission power, the first measurement result and the second measurement result are irrelevant with the uplink transmission power, which indicates that there is no interference of the uplink carrier to the downlink carrier.

It can be seen that in the case that the first measurement result includes the third RSRQ and the second measurement result includes the fourth RSRQ, the preset relationship may be a negative correlation. Therefore, when the terminal determines that there is a negative correlation between the first measurement result and the second measurement result with the uplink transmission power, it can determine that the degree of self-interference caused by the uplink transmission power is strong, so as to report the first measurement result and the second measurement result to the network side device, and the network side device can determine that the degree of self-interference caused by the uplink transmission power is strong after receiving the first measurement result and the second measurement result, so as to perform self-interference avoidance.

Further, in the case that the preset relationship is negatively correlated, the preset relationship may be a negative preset coefficient. The correlation can be a relationship coefficient representing a relationship between the first measurement result and the second measurement result and the uplink transmission power. If the relationship coefficient is less than the preset coefficient, it indicates that the interference caused by the uplink carrier to the downlink carrier is relatively serious, and the terminal reports the first measurement result and the second measurement result to the network side device.

Figure 5:
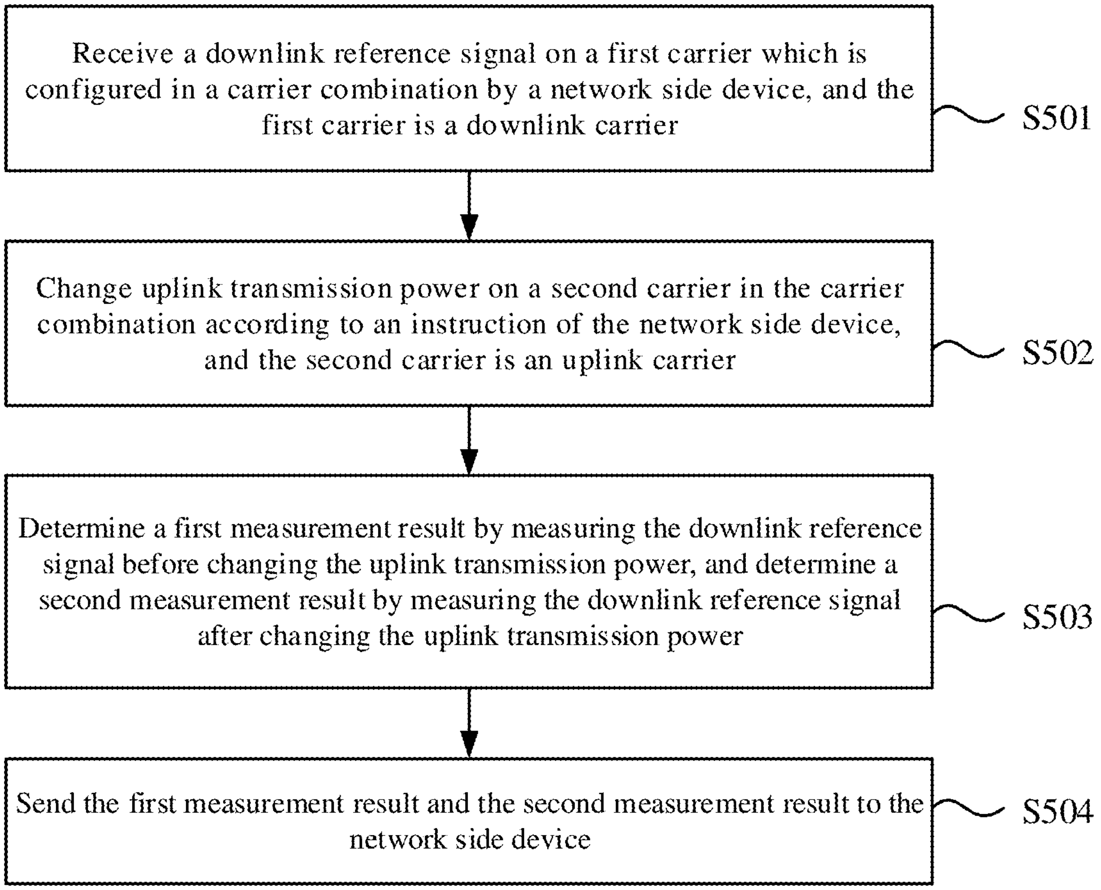
FIG. 5 is a schematic flowchart of a measurement result sending method according to an embodiment of the present disclosure.

FIG. 5 is a schematic flowchart of a measurement result sending method according to an embodiment of the present disclosure. The measurement result sending method shown in this embodiment can be executed by a terminal, which can communicate with a network side device. The terminal includes but is not limited to a communication apparatus such as a cell phone, a tablet computer, a wearable device, a sensor, an IoT device, etc., and the network side device includes but is not limited to a network side device in a communication system such as a base station, a core network, etc. in a 4G, 5G, 6G, etc. communication system.

As shown in FIG. 5, the measurement result sending method may include the following steps.

At step S501, a downlink reference signal is received on a first carrier which is configured in a carrier combination by a network side device, and the first carrier is a downlink carrier.

At step S502, uplink transmission power on a second carrier in the carrier combination is changed according to an instruction of the network side device, and the second carrier is an uplink carrier.

At step S503, a first measurement result is determined by measuring the downlink reference signal before changing the uplink transmission power, and a second measurement result is determined by measuring the downlink reference signal after changing the uplink transmission power.

At step S504, the first measurement result and the second measurement result are sent to the network side device.

In an embodiment, the terminal can determine a carrier combination containing multiple carriers according to a configuration of the network side device, and then can communicate with the network side device through multiple carriers in the carrier combination. Subsequently, the network side device may determine whether the carrier combination has potential self-interference based on a relationship between the corresponding frequencies of each carrier in the plurality of carriers, for example, a list of carrier combinations with potential self-interference may be predetermined, and then whether the carrier combination configured to the terminal has potential self-interference can be determined by looking up the table. For example, it may also determine whether the carrier combination configured to the terminal has potential self-interference based on formulas described in the aforementioned embodiment.

For example, in a carrier combination, a first carrier is a carrier affected by interference, and a second carrier is a carrier causing interference. The first carrier can be one carrier or multiple carriers, and similarly, the second carrier can be one carrier or multiple carriers.

The network side can send the downlink reference signal on the first carrier and instruct the terminal to change the uplink transmission power on the second carrier. Correspondingly, the terminal can receive the downlink reference signal on the first carrier and change the uplink transmission power on the second carrier according to the instruction of the network side device, and thereby determine a first measurement result by measuring the downlink reference signal before changing the uplink transmission power, as well as determine a second measurement result by measuring the downlink reference signal after changing the uplink transmission power, and report the first measurement result and the second measurement result to the network side device, so that the network side device can determine whether to perform self-interference avoidance according to the first measurement result and the second measurement result.

The terminal may change the uplink transmission power by increasing the uplink transmission power or reducing the uplink transmission power, and a magnitude of changing the uplink transmission power may be indicated by the network side device or may be determined by a protocol agreement. There may be various forms of the measurement result, and how the terminal determines the measurement result will be explained in the following embodiments.

According to the embodiment of the present disclosure, the terminal sends the first measurement result and the second measurement result to the network side device, so that the network side device determines whether to perform self-interference avoidance according to the first measurement result and the second measurement result, and in this process, the terminal only needs to change the uplink transmission power without deactivating the uplink transmission, so that the terminal will not interrupt the communication process, which is beneficial to ensuring a good communication effect.

It should be noted that the network side device determines whether to perform self-interference avoidance according to the first measurement result and the second measurement result, which mainly includes two situations. One is to determine that the degree of self-interference is relatively strong according to the first measurement result and the second measurement result, so self-interference avoidance is performed, and the other is to determine that the degree of self-interference is relatively weak according to the first measurement result and the second measurement result, so self-interference avoidance is not performed.

In an embodiment, the way of performing self-interference avoidance includes at least one of the following:

instructing the terminal to communicate on a carrier combination other than the carrier combination;

instructing the terminal that a configuration of the carrier combination is cancelled;

instructing the terminal to reduce the uplink transmission power on the second carrier; or increasing downlink transmission power on the first carrier.

In an embodiment, the degree of self-interference is mainly related to the uplink transmission power, for example, the greater the uplink transmission power, the stronger the degree of self-interference, and the smaller the uplink transmission power, the weaker the degree of self-interference.

Therefore, when the network side device determines that the degree of self-interference is relatively strong according to measurement results, and self-interference avoidance is needed, it can instruct the terminal to reduce the uplink transmission power on the second carrier, thereby reducing the self-interference on a downlink reception of the first carrier, which is beneficial to obtaining good communication effect.

In addition, the network side device can perform self-interference avoidance by increasing the downlink transmission power on the first carrier, so even the uplink transmission of the second carrier will still cause interference to the downlink reception of the first carrier, but because the downlink transmission power on the first carrier is increased, which is equivalent to an improvement of signal-to-noise ratio under the condition that other conditions remain unchanged (such as the uplink transmission power is unchanged), which is conducive to obtaining good communication effects.

Since the carrier combination has a self-interference problem, the network side device can perform self-interference avoidance by instructing the terminal to communicate on a carrier combination other than the carrier combination, for example, on other carrier combinations without potential self-interference, and good communication effect can also be obtained. Or, the network side device can instruct the terminal that a configuration of the carrier combination is cancelled, then the terminal can stop communicating on the carrier combination, and poor communication quality can be avoided to a certain extent.

Figure 6:
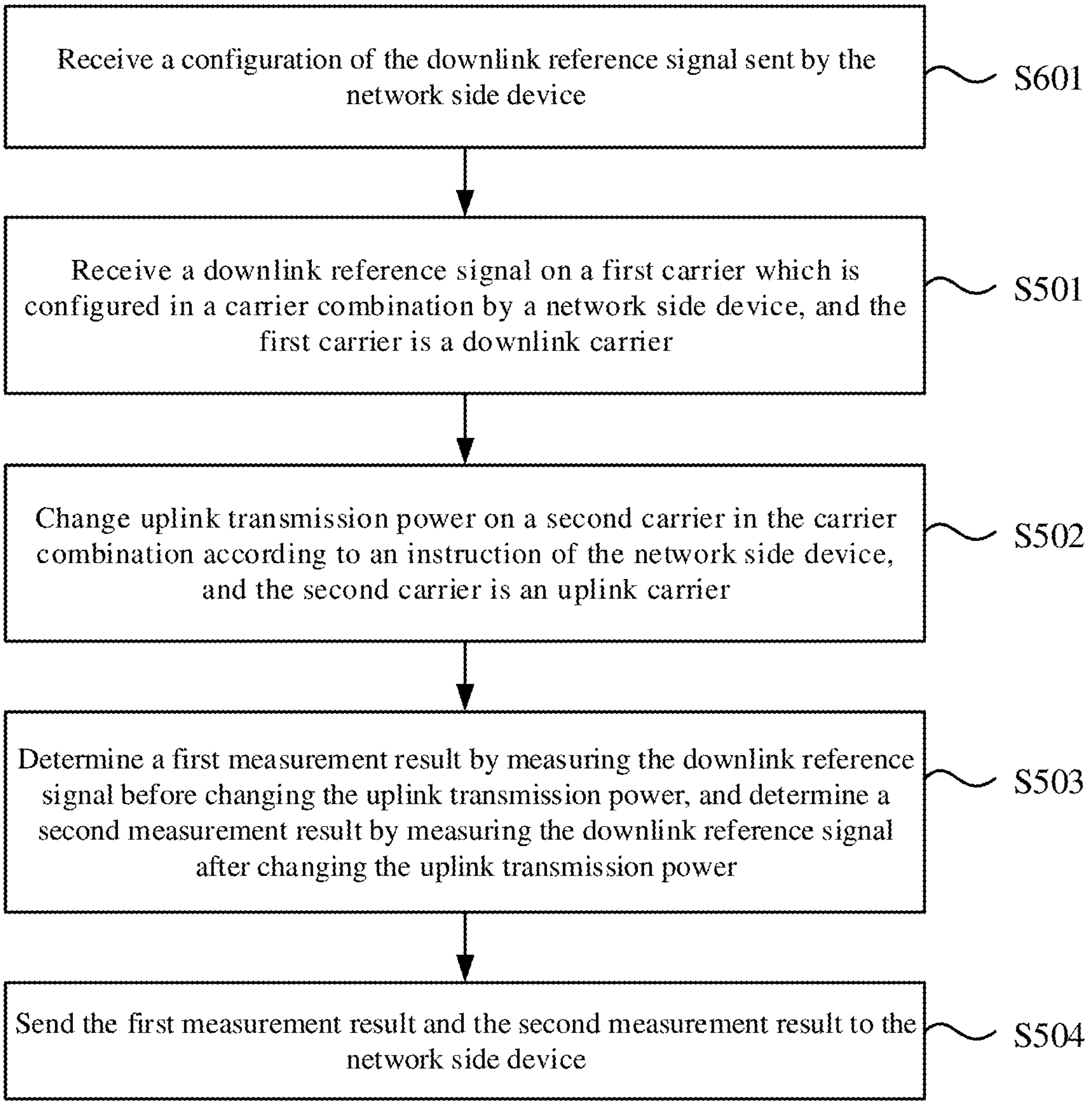
FIG. 6 is a schematic flowchart of another measurement result sending method according to an embodiment of the present disclosure.

FIG. 6 is a schematic flowchart of another measurement result sending method according to an embodiment of the present disclosure. As shown in FIG. 6, before receiving the downlink reference signal on the first carrier, the method further includes the following steps.

At step S601, a configuration of the downlink reference signal sent by the network side device is received.

In an embodiment, when receiving the configuration, the terminal can determine that the network side device needs the terminal to report the first measurement result and the second measurement result, and then the terminal can receive the downlink reference signal according to the configuration, and change the uplink transmission power according to the instruction of the network side device, so as to report measurement results determined based on the uplink transmission power before and after the change and the downlink reference signal to the network side device. Accordingly, the network side device, upon determining a frequency band combination with potential self-interference, may send the configuration of the downlink reference signal to the terminal.

In an embodiment, before receiving the configuration of the downlink reference signal sent by the network side device, the method further includes:

sending capability indication information to the network side device, where the capability indication information indicates whether the terminal has the capability to determine and report the first measurement result and the second measurement result.

In an embodiment, due to different capabilities of different terminals, some terminals have the capability to determine and report a first measurement result and a second measurement result, while others have no capability to determine or report the first measurement result and the second measurement result. If configuration information of downlink reference signal is sent to a terminal that has no capability to determine the measurement results, the terminal will not be able to determine and report the first measurement result and the second measurement result, which will lead to wasted overhead.

Therefore, before receiving the configuration of the downlink reference signal, the terminal may first report the capability indication information to the network side device, and inform the network side device through the capability indication information whether the terminal has the capability to determine and report the first measurement result and the second measurement result. The network side device can determine whether the terminal has the capability to determine and report the first measurement result and the second measurement result according to the capability indication information. Only when the terminal has the capability to determine and report the first measurement result and the second measurement result, the network side device sends the configuration information of the downlink reference signal to the terminal, and then the terminal receives the downlink reference signal according to the configuration and attempts to determine the first measurement result and the second measurement result, as well as reports the first measurement result and the second measurement result. When the terminal has no capability to determine and report the first measurement result and the second measurement result, the network side device does not need to send the configuration information of the downlink reference signal to the terminal, and the terminal will not receive the downlink reference signal according to the configuration and attempt to determine the first measurement result and the second measurement result, thus avoiding wasted overhead.

Figure 7:
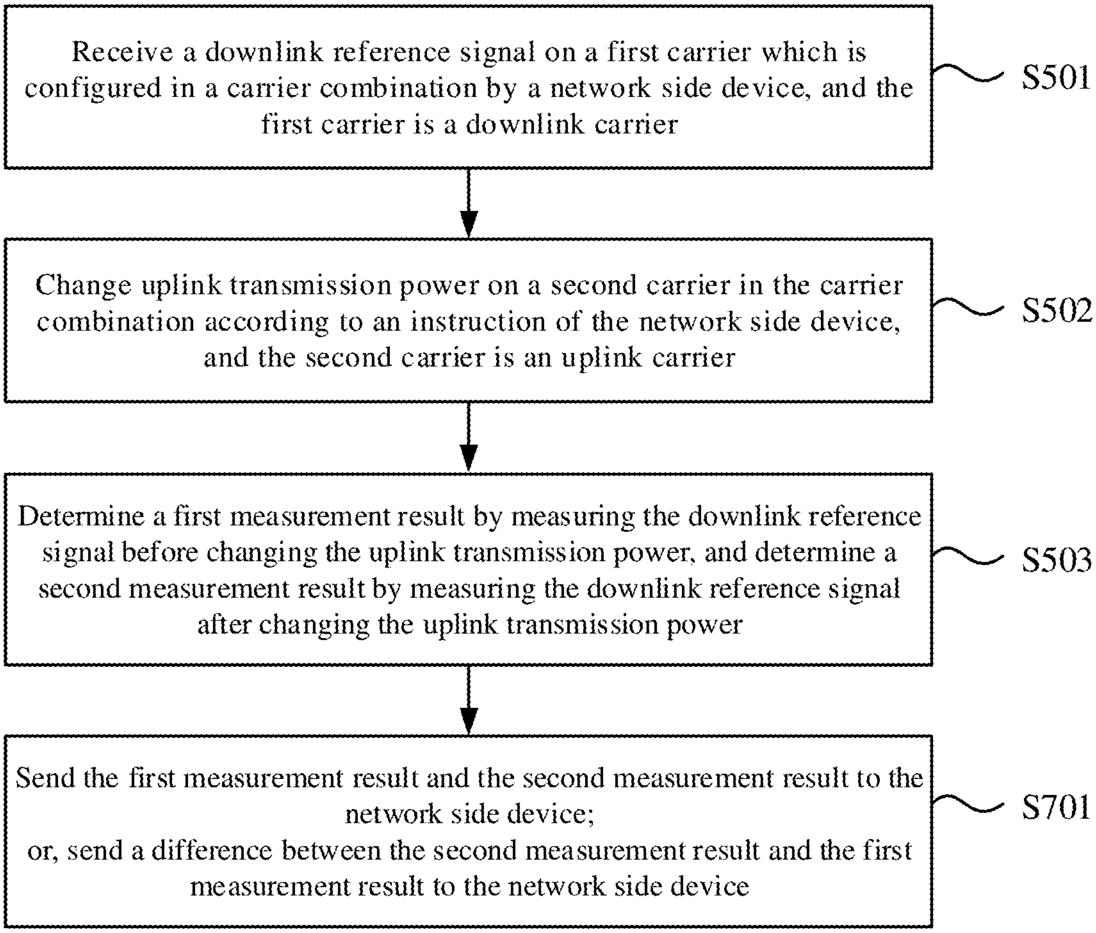
FIG. 7 is a schematic flowchart of yet another measurement result sending method according to an embodiment of the present disclosure.

FIG. 7 is a schematic flowchart of yet another measurement result sending method according to an embodiment of the present disclosure. As shown in FIG. 7, sending the first measurement result and the second measurement result to the network side device includes the following steps.

At step 701, the first measurement result and the second measurement result are sent to the network side device; or, a difference between the second measurement result and the first measurement result is sent to the network side device.

In an embodiment, the terminal receives a downlink reference signal according to the configuration information, determines a first measurement result by measuring the downlink reference signal before changing uplink transmission power, determines a second measurement result by measuring the downlink reference signal after changing the uplink transmission power, then can directly report the first measurement result and the second measurement result to the network side device, and then the network side device calculates a difference between the second measurement result and the first measurement result. The terminal can also calculate the difference between the second measurement result and the first measurement result, and then report the difference between the second measurement result and the first measurement result to the network side device, so that the network side device can determine whether to perform self-interference avoidance according to the difference between the second measurement result and the first measurement result.

In an embodiment, the first measurement result includes a first received signal strength indication (RSSI), for example notated as RSSI_1, and the second measurement result includes a second RSSI, for example notated as RSSI_2, so the difference between the second measurement result and the first measurement result is the second RSSI minus the first RSSI (RSSI_2−RSSI_1).

Or, the first measurement result includes a first reference signal receiving quality (RSRQ), for example notated as RSRQ_1, and the second measurement result includes a second RSRQ, for example notated as RSRQ_2, so the difference between the second measurement result and the first measurement result is the second RSRQ minus the first RSRQ (RSRQ_2−RSRQ_1).

In an embodiment, the network side device can compare the difference between the second measurement result and the first measurement result with a first threshold, taking RSRQ as an example of the measurement result, the difference (RSRQ_2−RSRQ_1) reflects a change degree of RSRQ before and after the change of uplink transmission power. If the difference (RSRQ_2−RSRQ_1) is greater than the first threshold, it means that RSRQ changes greatly with the change of uplink transmission power, so RSRQ is greatly affected by uplink transmission power, so it can be judged that the degree of self-interference caused by uplink transmission power is strong, and then self-interference avoidance can be performed.

Accordingly, if the difference (RSRQ_2−RSRQ_1) is less than or equal to the first threshold, it means that RSRQ changes little with the change of uplink transmission power, so RSRQ is less affected by uplink transmission power, so it can be judged that the degree of self-interference caused by uplink transmission power is weak, and then self-interference avoidance may not be performed. Subsequently, the communication of terminal can be scheduled normally according to the configuration on the frequency/carrier combination.

Figure 8:
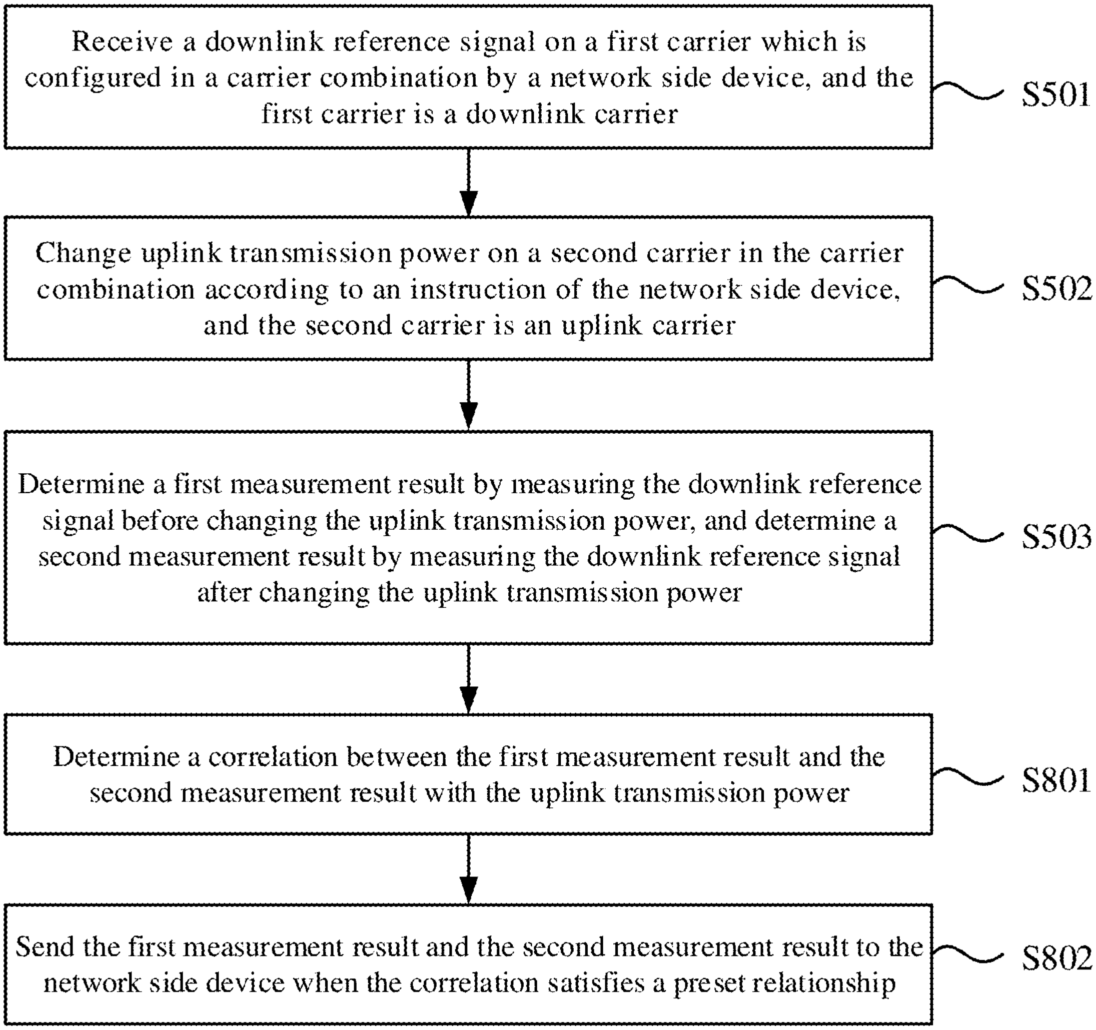
FIG. 8 is a schematic flowchart of yet another measurement result sending method according to an embodiment of the present disclosure.

FIG. 8 is a schematic flowchart of yet another measurement result sending method according to an embodiment of the present disclosure. As shown in FIG. 8, sending the first measurement result and the second measurement result to the network side device includes the following steps.

At step S801, a correlation between the first measurement result and the second measurement result with the uplink transmission power is determined.

At step S802, the first measurement result and the second measurement result are sent to the network side device when the correlation satisfies a preset relationship.

In an embodiment, the terminal determines the first measurement result by measuring the downlink reference signal before changing the uplink transmission power and the second measurement result by measuring the downlink reference signal after changing the uplink transmission power, so as to determine a correlation between the first measurement result and the second measurement result with the uplink transmission power.

The correlation may represent the interference of uplink transmission power on downlink reception. When the correlation satisfies a preset relationship, it may be determined that the uplink transmission has a greater impact on downlink reception, i.e., the degree of self-interference is relatively greater, and thus the first measurement result and the second measurement result are sent to the network side device when the correlation satisfies the preset relationship. The network side device performs the self-interference avoidance in response to receiving the first measurement result and the second measurement result.

The preset relationship includes a positive correlation and/or a negative correlation, for example, the preset relationship is the positive correlation, and the terminal can send the first measurement result and the second measurement result to the network side device if the correlation is determined to be positive correlation, and not send the first measurement result and the second measurement result to the network side device if the correlation is determined to be negative correlation. In an embodiment, the measurement result includes at least one of the following: a difference between RSSI and reference signal receiving power (RSRP); or an RSRQ.

In an embodiment, sending the first measurement result and the second measurement result to the network side device when the correlation satisfies a preset relationship includes:

sending the first measurement result and the second measurement result to the network side device when the correlation satisfies a preset relationship, and a difference between RSSI and RSRP determined by measuring the downlink reference signal is greater than a second threshold or the RSRQ determined by measuring the downlink reference signal is less than a third threshold, where the first measurement result includes a first difference between RSSI and RSRP determined according to the downlink reference signal before changing the uplink transmission power, and the second measurement result includes a second difference between RSSI and RSRP determined according to the downlink reference signal after changing the uplink transmission power; or, the first measurement result includes a third RSRQ determined by measuring the downlink reference signal before changing the uplink transmission power, and the second measurement result includes a fourth RSRQ determined by measuring the downlink reference signal after changing the uplink transmission power.

In an embodiment, when the terminal sends the first measurement result and the second measurement result to the network side device, besides considering whether the correlation meets the preset relationship, it can further consider the difference between RSSI and RSRP determined according to a current downlink reference signal (for example, after changing the uplink transmission power) or consider the RSRQ determined according to the current downlink reference signal (for example, after changing the uplink transmission power). So as to ensure that the first measurement result and the second measurement result are sent to the network side device only when self-interference avoidance is needed to be performed.

It should be noted that when the difference between RSSI and RSRP determined according to the current downlink reference signal or RSRQ determined according to the current downlink reference signal is further considered to judge whether to send the first measurement result and the second measurement result to the network side device, the first measurement result and the second measurement result mainly include two situations.

In a first situation, the first measurement result includes a first difference between the RSSI and the RSRP determined according to the downlink reference signal before changing the uplink transmission power, and the second measurement result includes a second difference between the RSSI and the RSRP determined according to the downlink reference signal after changing the uplink transmission power.

In this situation, if it is determined that the correlation satisfies the preset relationship, the terminal can further judge whether the difference between the current RSSI and RSRP is greater than a second threshold (which can also be named as a reference threshold), and if it is greater than the second threshold, it can be determined that the current self-interference is indeed relatively large, then the first measurement result and the second measurement result can be reported to the network side device, so that the network side device can perform self-interference avoidance. In this situation, if the correlation satisfies the preset relationship, the terminal can further judge whether the difference between the current RSSI and RSRP is greater than a second threshold, and if it is greater than the second threshold, it can be determined that the current self-interference is indeed relatively large, then the first measurement result and the second measurement result can be reported to the network side device, so that the network side device can perform self-interference avoidance.

In a second situation, the first measurement result includes a third RSRQ determined by measuring the downlink reference signal before changing the uplink transmission power, and the second measurement result includes a fourth RSRQ determined by measuring the downlink reference signal after changing the uplink transmission power.

In this situation, if the correlation satisfies the preset relationship, the terminal can further judge whether the difference between the current RSSI and RSRP is greater than a second threshold, and if it is greater than the second threshold, it can be determined that the current self-interference is indeed relatively large, then the first measurement result and the second measurement result can be reported to the network side device, so that the network side device can perform self-interference avoidance. Or, if the correlation satisfies the preset relationship, the terminal can further judge whether the current RSRQ is less than a third threshold (which can also be named as a set threshold), and if it is less than the third threshold, it can be determined that the current self-interference is indeed relatively large, then the first measurement result and the second measurement result can be reported to the network side device, so that the network side device can perform self-interference avoidance.

Figure 9:
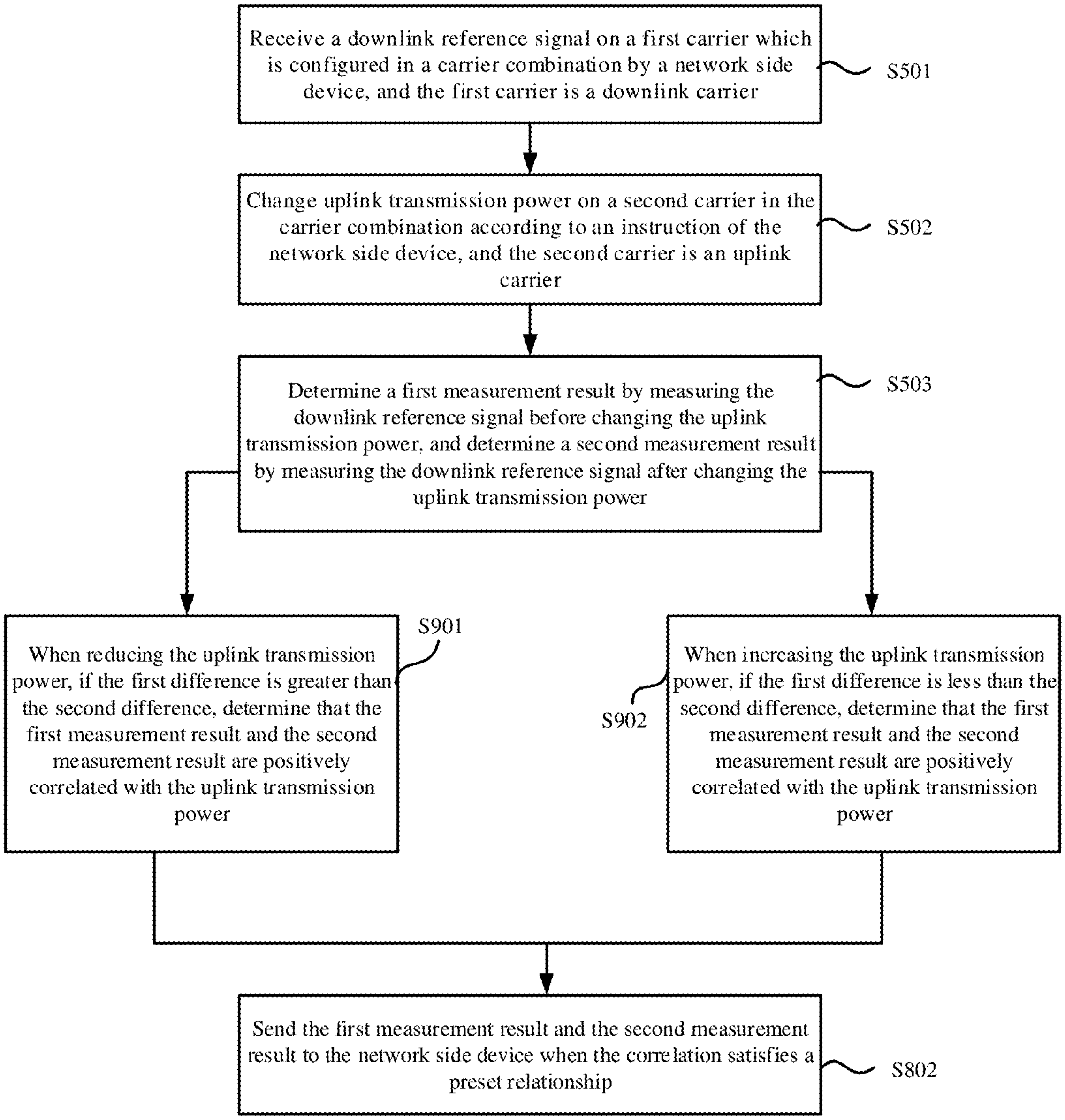
FIG. 9 is a schematic flowchart of yet another measurement result sending method according to an embodiment of the present disclosure.

FIG. 9 is a schematic flowchart of yet another measurement result sending method according to an embodiment of the present disclosure. As shown in FIG. 9, the first measurement result includes a first difference between RSSI and RSRP determined according to the downlink reference signal before changing the uplink transmission power; the second measurement result includes a second difference between RSSI and RSRP determined according to the downlink reference signal after changing the uplink transmission power, and the preset relationship is a positive correlation.

Determining a correlation between the first measurement result and the second measurement result with the uplink transmission power includes the following steps.

At step 901, when the uplink transmission power is reduced, if the first difference is greater than the second difference, it is determined that the first measurement result and second measurement result are positively correlated with the uplink transmission power.

At step 902, when the uplink transmission power is increased, if the first difference is less than the second difference, it is determined that the first measurement result and second measurement result are positively correlated with the uplink transmission power.

In an embodiment, for example, the measurement result is the difference between RSSI and RSRP. The first measurement result is a difference between RSSI and RSRP determined according to the downlink reference signal before the terminal changes the uplink transmission power, for example, named as a first difference (for example, notated as RSSI_1−RSRP_1), and the second measurement result is a difference between RSSI and RSRP determined according to the downlink reference signal after the terminal changes the uplink transmission power, for example, named as a second difference (for example, notated as RSSI_2−RSRP_2). The difference between RSSI and RSRP (RSSI-RSRP) can represent the degree of self-interference. If the difference between RSSI and RSRP (RSSI-RSRP) is large, the degree of self-interference is large, and if the difference between RSSI and RSRP (RSSI-RSRP) is small, the degree of self-interference is small.

In the case of changing the uplink transmission power to reduce the uplink transmission power, if the first difference is greater than the second difference, e.g., (RSSI_1−RSRP_1)>(RSSI_2−RSRP_2), which indicates that the degree of self-interference is reduced with the reduction of the uplink transmission power, the first measurement result and the second measurement result are positively correlated with the uplink transmission power.

Accordingly, if the first difference is less than the second difference, e.g., (RSSI_1−RSRP_1)<(RSSI_2−RSRP_2), which indicates that the degree of self-interference is increased with the reduction of the uplink transmission power, the first measurement result and the second measurement result are negatively correlated with the uplink transmission power.

However, if the first difference is equal to the second difference, e.g., (RSSI_1−RSRP_1)=(RSSI_2−RSRP_2), which indicates that the degree of self-interference is not affected with the reduction of the uplink transmission power, the first measurement result and the second measurement result are irrelevant with the uplink transmission power.

In the case of changing the uplink transmission power to increase the uplink transmission power, if the first difference is less than the second difference, e.g., (RSSI_1−RSRP_1)<(RSSI_2−RSRP_2), which indicates that the degree of self-interference is increased with the increase of the uplink transmission power, the first measurement result and the second measurement result are positively correlated with the uplink transmission power.

Accordingly, if the first difference is greater than the second difference, e.g., (RSSI_1−RSRP_1)>(RSSI_2−RSRP_2), which indicates that the degree of self-interference is reduced with the increase of the uplink transmission power, the first measurement result and the second measurement result are negatively correlated with the uplink transmission power.

However, if the first difference is equal to the second difference, e.g., (RSSI_1−RSRP_1)=(RSSI_2−RSRP_2), which indicates that the degree of self-interference is not affected with the increase of the uplink transmission power, the first measurement result and the second measurement result are irrelevant with the uplink transmission power.

It can be seen that in the case that the first measurement result is (RSSI_1–RSRP_1) and the second measurement result is (RSSI_2–RSRP_2), the preset relationship can be a positive correlation, Therefore, when the terminal determines that there is a positive correlation between the first measurement result and the second measurement result with the uplink transmission power, it can determine that the uplink carrier interferes with the downlink carrier, so as to report the first measurement result and the second measurement result to the network side device, and the network side device can determine that the degree of self-interference caused by the uplink transmission power is strong after receiving the first measurement result and the second measurement result, so as to perform self-interference avoidance.

Further, in the case that the preset relationship is positively correlated, the preset relationship may be a positive preset coefficient. The correlation can be a relationship coefficient representing a relationship between the first measurement result and the second measurement result and the uplink transmission power. If the relationship coefficient is greater than the preset coefficient, it indicates that the interference caused by the uplink carrier to the downlink carrier is relatively serious, and the terminal reports the first measurement result and the second measurement result to the network side device.

Figure 10:
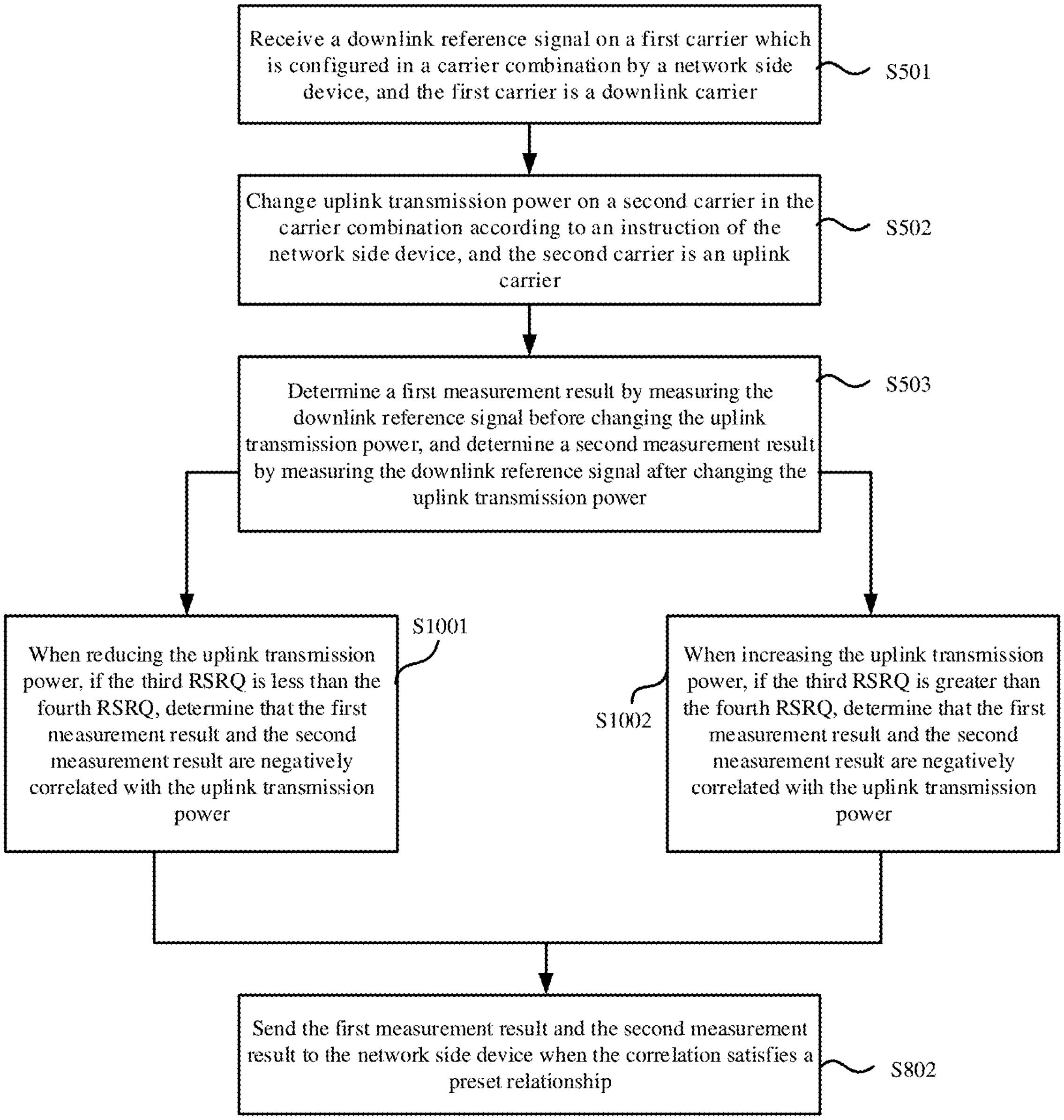
FIG. 10 is a schematic flowchart of yet another measurement result sending method according to an embodiment of the present disclosure.

FIG. 10 is a schematic flowchart of yet another measurement result sending method according to an embodiment of the present disclosure. As shown in FIG. 10, the first measurement result includes a third RSRQ determined by measuring the downlink reference signal before changing the uplink transmission power, and the second measurement result includes a fourth RSRQ determined by measuring the downlink reference signal after changing the uplink transmission power, and the preset relationship is a negative correlation.

Determining a correlation between the first measurement result and the second measurement result with the uplink transmission power includes the following steps.

At step S1001, when the uplink transmission power is reduced, if the third RSRQ is less than the fourth RSRQ, it is determined that the first measurement result and second measurement result are negatively correlated with the uplink transmission power.

At step S1002, when the uplink transmission power is increased, if the third RSRQ is greater than the fourth RSRQ, it is determined that the first measurement result and second measurement result are negatively correlated with the uplink transmission power.

In an embodiment, for example, the measurement result is RSRQ, the first measurement result is an RSRQ determined before the terminal changes the uplink transmission power, for example referred to as a third RSRQ, and the second measurement result is an RSRQ determined after the terminal changes the uplink transmission power, for example referred to as a fourth RSRQ, RSRQ may represent the degree of self-interference. If the RSRQ is large, the degree of self-interference is small, and if the RSRQ is small, the degree of self-interference is large.

In the case of changing the uplink transmission power to reduce the uplink transmission power, if the third RSRQ is less than the fourth RSRQ, it means that the RSRQ becomes larger with the reduction of the uplink transmission power, and therefore the degree of self-interference is reduced, so the first measurement result and second measurement result are negatively correlated with the uplink transmission power, which indicates that the uplink carrier interferes with the downlink carrier.

Accordingly, if the third RSRQ is greater than the fourth RSRQ, it means that the RSRQ becomes smaller with the reduction of the uplink transmission power, so the degree of self-interference increases, the first measurement result and second measurement result are positively correlated with the uplink transmission power, which indicates that there is no interference of the uplink carrier to the downlink carrier.

However, if the third RSRQ is equal to the fourth RSRQ, it means that the degree of self-interference is not affected with the reduction of the uplink transmission power, the first measurement result and the second measurement result are irrelevant with the uplink transmission power, which indicates that there is no interference of the uplink carrier to the downlink carrier.

In the case of changing the uplink transmission power to increase the uplink transmission power, if the third RSRQ is greater than the fourth RSRQ, it means that the RSRQ becomes smaller with the increase of the uplink transmission power, and therefore the degree of self-interference is increased, the first measurement result and second measurement result are negatively correlated with the uplink transmission power, which indicates that the uplink carrier interferes with the downlink carrier.

Accordingly, if the third RSRQ is less than the fourth RSRQ, it means that the RSRQ becomes larger with the increase of the uplink transmission power, so the degree of self-interference is reduced, the first measurement result and second measurement result are positively correlated with the uplink transmission power, which indicates that there is no interference of the uplink carrier to the downlink carrier.

However, if the third RSRQ is equal to the fourth RSRQ, it means that the degree of self-interference is not affected with the increase of the uplink transmission power, the first measurement result and the second measurement result are irrelevant with the uplink transmission power, which indicates that there is no interference of the uplink carrier to the downlink carrier.

It can be seen that in the case that the first measurement result includes the third RSRQ and the second measurement result includes the fourth RSRQ, the preset relationship may be a negative correlation. Therefore, when the terminal determines that there is a negative correlation between the first measurement result and the second measurement result with the uplink transmission power, it can determine that the uplink carrier interferes with the downlink carrier, so as to report the first measurement result and the second measurement result to the network side device, and the network side device can determine that the degree of self-interference caused by the uplink transmission power is strong after receiving the first measurement result and the second measurement result, so as to perform self-interference avoidance.

Further, in the case that the preset relationship is negatively correlated, the preset relationship may be a negative preset coefficient. The correlation can be a relationship coefficient representing a relationship between the first measurement result and the second measurement result and the uplink transmission power. If the relationship coefficient is less than the preset coefficient, it indicates that the interference caused by the uplink carrier to the downlink carrier is relatively serious, and the terminal reports the first measurement result and the second measurement result to the network side device.

Figure 11:
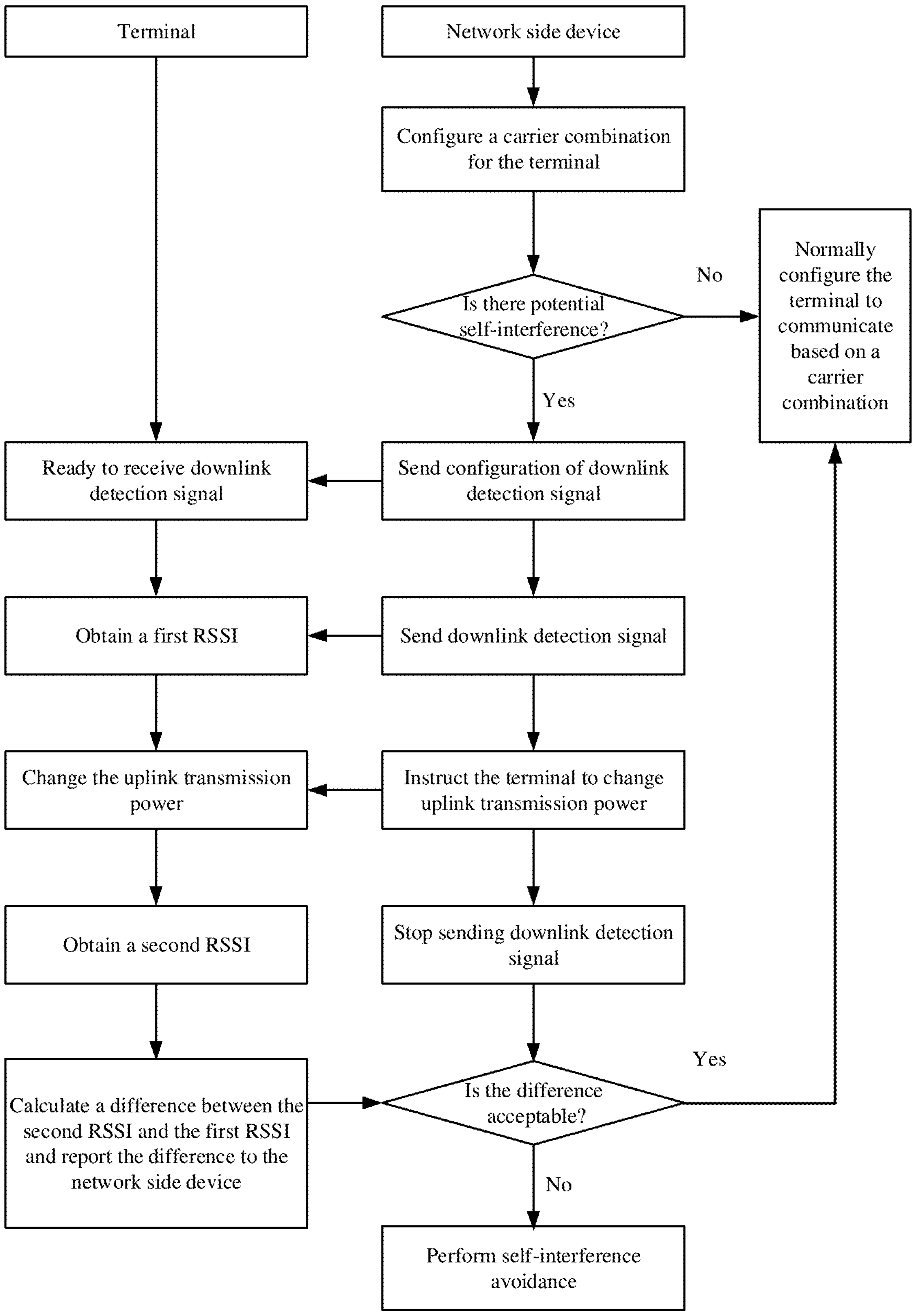
FIG. 11 is a schematic diagram of an interaction between a network side device and a terminal according to an embodiment of the present disclosure.

FIG. 11 is a schematic diagram of an interaction between a network side device and a terminal according to an embodiment of the present disclosure. As shown in FIG. 11:

Firstly, the network side device can configure the terminal with a carrier combination containing multiple carriers.

Then, the network side device can determine whether there is potential self-interference in the carrier combination. If there is no potential self-interference, the terminal can be normally configured to communicate based on the carrier combination, and if there is potential self-interference, configuration information of a downlink reference signal can be sent to the terminal, so that the terminal can start preparing to receive the downlink reference signal and determine measurement results.

Next, the network side device can send the downlink reference signal on an interfered first carrier, and the terminal can receive the downlink reference signal according to the configuration information, and determine a first RSSI according to the received downlink reference signal.

Further, the network side device can instruct the terminal to change uplink transmission power on a second carrier that causes interference, and the terminal changes the uplink transmission power on the second carrier according to the instruction of the network side device, and determines RSSI again according to the downlink reference signal after changing the uplink transmission power, for example, named as a second RSSI, and then can report a difference between the second RSSI and the first RSSI to the network side device.

The network side device determines whether the difference is acceptable, and performs self-interference avoidance when the difference is greater than a first threshold. When the difference is less than or equal to the first threshold, the terminal can be normally configured to communicate based on the carrier combination without self-interference avoidance.

Corresponding to the aforementioned embodiments of self-interference avoidance method and measurement result sending method, the present disclosure further provides embodiments of self-interference avoidance apparatus and measurement result sending apparatus.

Figure 12:
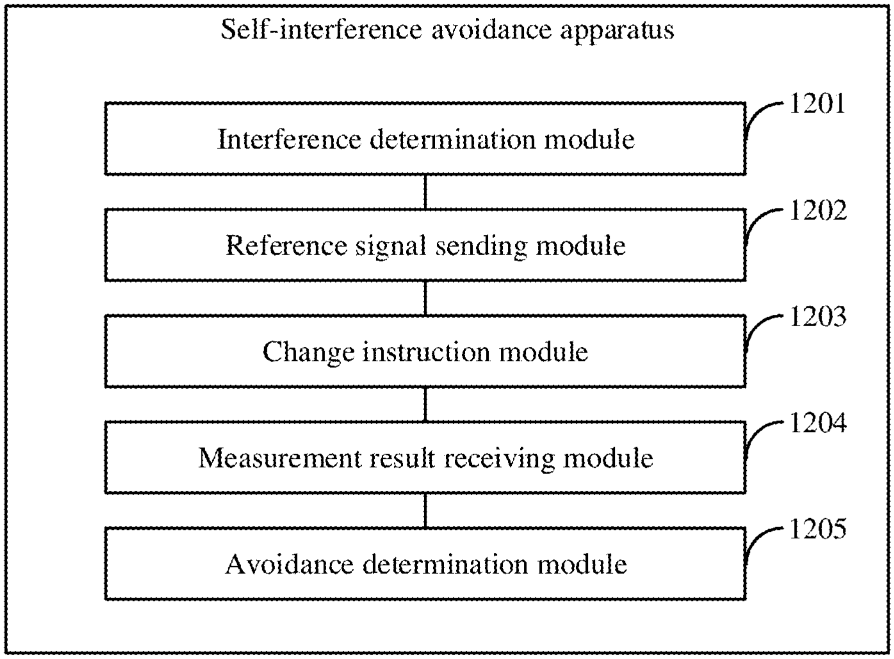
FIG. 12 is a schematic block diagram of a self-interference avoidance apparatus according to an embodiment of the present disclosure.

FIG. 12 is a schematic block diagram of a self-interference avoidance apparatus according to an embodiment of the present disclosure. As shown in FIG. 12, an embodiment of the present disclosure provides a self-interference avoidance apparatus, which can be applied to a network side device, the network side device includes but is not limited to a network side device in a communication system such as 4G, 5G, 6G, etc., such as a base station and a core network, the network side device may be in communication with a terminal, the terminal including but not limited to a communication apparatus such as a cell phone, a tablet computer, a wearable device, a sensor, an IoT device, etc.

In an embodiment, the self-interference avoidance apparatus includes:

- an interference determination module 1201, configured to determine a carrier combination with potential self-interference, where the carrier combination includes a first carrier subjected to interference and a second carrier causing interference;
- a reference signal sending module 1202, configured to send a downlink reference signal on the first carrier;
- a change instruction module 1203, configured to instruct a terminal to change uplink transmission power on the second carrier;
- a measurement result receiving module 1204, configured to receive a first measurement result and a second measurement result reported by the terminal,
- where the first measurement result is a measurement result determined by the terminal by measuring the downlink reference signal before changing the uplink transmission power, and the second measurement result is a measurement result determined by measuring the downlink reference signal after changing the uplink transmission power; and
- an avoidance determination module 1205, configured to determine whether to perform self-interference avoidance according to the first measurement result and the second measurement result.

Figure 13:
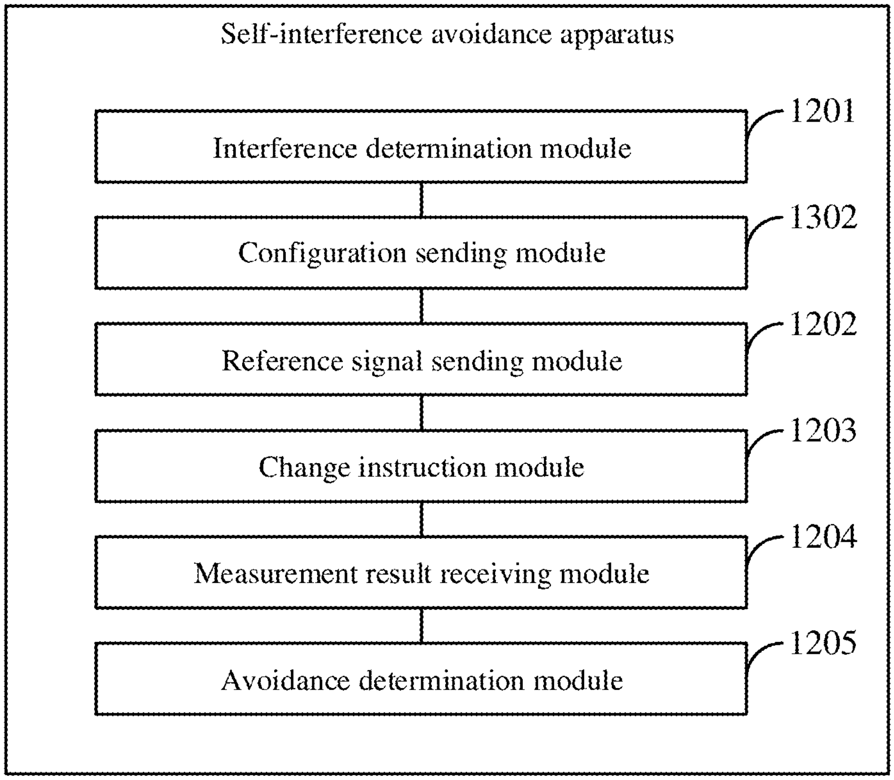
FIG. 13 is a schematic block diagram of another self-interference avoidance apparatus according to an embodiment of the present disclosure.

FIG. 13 is a schematic block diagram of another self-interference avoidance apparatus according to an embodiment of the present disclosure. As shown in FIG. 13, in an embodiment, the apparatus further includes:

a configuration sending module 1301, configured to send a configuration of the downlink reference signal to the terminal.

In an embodiment, the configuration sending module is configured to send the configuration of the downlink reference signal to the terminal in response to the terminal being capable of determining and reporting the first measurement result and the second measurement result.

In an embodiment, the way of performing self-interference avoidance includes at least one of the following:

- instructing the terminal to communicate on a carrier combination other than the carrier combination;
- instructing the terminal that a configuration of the carrier combination is cancelled;
- instructing the terminal to reduce the uplink transmission power on the second carrier; or
- increasing downlink transmission power on the first carrier.

In an embodiment, the avoidance determination module is configured to determine whether to perform the self-interference avoidance according to a difference between the second measurement result and the first measurement result.

In an embodiment, the avoidance determination module is configured to perform the self-interference avoidance when the difference is greater than a first threshold.

In an embodiment, the first measurement result includes a first received signal strength indication (RSSI), and the second measurement result includes a second RSSI; or the first measurement result includes a first reference signal receiving quality (RSRQ), and the second measurement result includes a second RSRQ.

In an embodiment, the avoidance determination module is configured to perform the self-interference avoidance in response to receiving the first measurement result and the second measurement result.

In an embodiment, the measurement result includes at least one of the following: a difference between RSSI and reference signal receiving power (RSRP); or an RSRQ.

Figure 14:
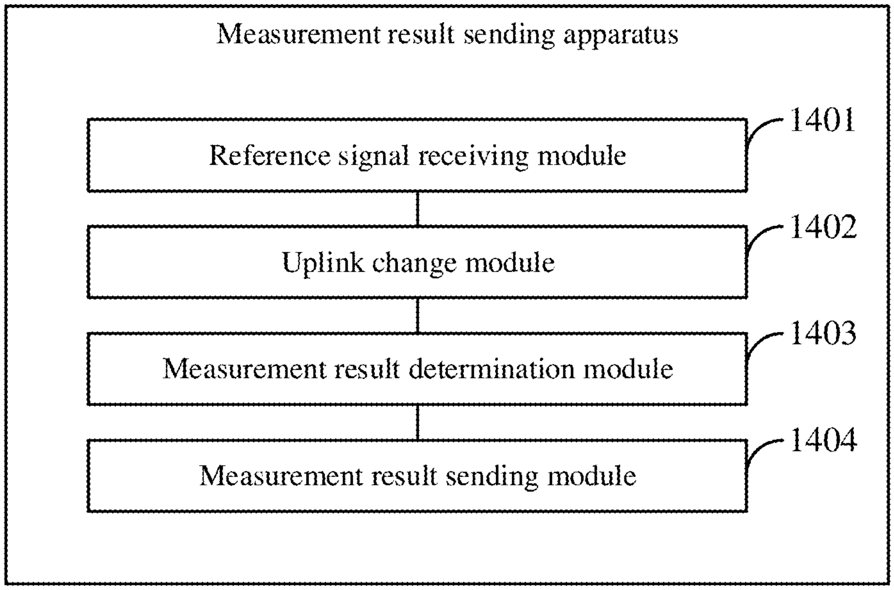
FIG. 14 is a schematic block diagram of a measurement result sending apparatus according to an embodiment of the present disclosure.

FIG. 14 is a schematic block diagram of a measurement result sending apparatus according to an embodiment of the present disclosure. As shown in FIG. 14, an embodiment of the present disclosure provides a measurement result sending apparatus, which can be applied to a terminal that can communicate with a network side device. The terminal includes but is not limited to a communication apparatus such as a cell phone, a tablet computer, a wearable device, a sensor, an IoT device, etc., and the network side device includes but is not limited to a network side device in a communication system such as a base station, a core network, etc. in a 4G, 5G, 6G, etc. communication system.

In an embodiment, the measurement result sending apparatus includes:

a reference signal receiving module 1401, configured to receive a downlink reference signal on a first carrier which is configured in a carrier combination by a network side device;

an uplink change module 1402, configured to change uplink transmission power on a second carrier in the carrier combination according to an instruction of the network side device;

a measurement result determination module 1403, configured to determine a first measurement result by measuring the downlink reference signal before changing the uplink transmission power 1403, and determine a second measurement result by measuring the downlink reference signal after changing the uplink transmission power; and a measurement result sending module 1404, configured to send the first measurement result and the second measurement result to the network side device.

In one embodiment, the processor is further configured to: receive a configuration of the downlink reference signal sent by the network side device.

Figure 15:
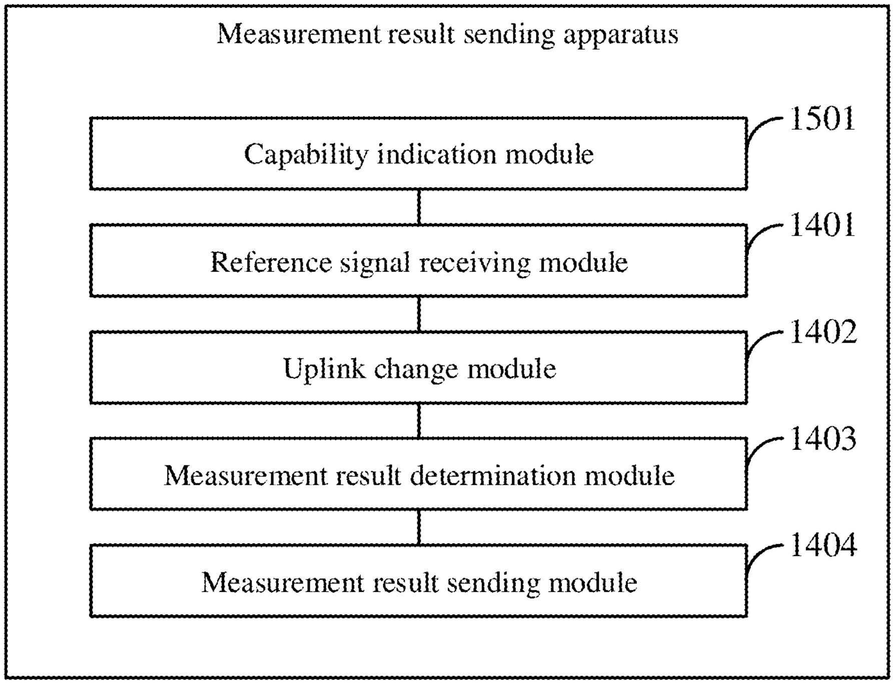
FIG. 15 is a schematic block diagram of another measurement result sending apparatus according to an embodiment of present disclosure.

FIG. 15 is a schematic block diagram of another measurement result sending apparatus according to an embodiment of present disclosure. As shown in FIG. 15, in an embodiment, the apparatus further includes:

a capability indication module 1501, configured to send capability indication information to the network side device, where the capability indication information indicates whether the terminal has the capability to determine and report the first measurement result and the second measurement result.

In one embodiment, the measurement result sending module is configured to send the first measurement result and the second measurement result to the network side device; or, send a difference between the second measurement result and the first measurement result to the network side device.

In an embodiment, the first measurement result includes a first received signal strength indication (RSSI), and the second measurement result includes a second RSSI; or the first measurement result includes a first reference signal receiving quality (RSRQ), and the second measurement result includes a second RSRQ.

In an embodiment, the measurement result sending module is configured to: determine a correlation between the first measurement result and the second measurement result with the uplink transmission power; send the first measurement result and the second measurement result to the network side device when the correlation satisfies a preset relationship.

In an embodiment, the measurement result sending module is configured to: send the first measurement result and the second measurement result to the network side device when the correlation satisfies a preset relationship, and a difference between RSSI and RSRP determined by measuring the downlink reference signal is greater than a second threshold or the RSRQ determined by measuring the downlink reference signal is less than a third threshold, where the first measurement result includes a first difference between the RSSI and the RSRP determined according to the downlink reference signal before changing the uplink transmission power, and the second measurement result includes a second difference between the RSSI and the RSRP determined according to the downlink reference signal after changing the uplink transmission power; or, the first measurement result includes a third RSRQ determined by measuring the downlink reference signal before changing the uplink transmission power, and the second measurement result includes a fourth RSRQ determined by measuring the downlink reference signal after changing the uplink transmission power.

In an embodiment, the first measurement result includes a first difference between RSSI and RSRP determined according to the downlink reference signal before changing the uplink transmission power; the second measurement result includes a second difference between RSSI and RSRP determined according to the downlink reference signal after changing the uplink transmission power, and the preset relationship is a positive correlation.

The measurement result sending module is configured to: when reducing the uplink transmission power, in response to determining that the first difference is greater than the second difference, determine that the first measurement result and second measurement result are positively correlated with the uplink transmission power; and when increasing the uplink transmission power, in response to determining that the first difference is less than the second difference, determine that the first measurement result and second measurement result are positively correlated with the uplink transmission power.

In an embodiment, the first measurement result includes a third RSRQ determined according to the downlink reference signal before changing the uplink transmission power, and the second measurement result includes a fourth RSRQ determined according to the downlink reference signal after changing the uplink transmission power, and the preset relationship is a negative correlation;

The measurement result sending module is configured to: when reducing the uplink transmission power, in response to determining that the third RSRQ is less than the fourth RSRQ, determine that the first measurement result and second measurement result are negatively correlated with the uplink transmission power; and when increasing the uplink transmission power, in response to determining that the third RSRQ is greater than the fourth RSRQ, determine that the first measurement result and second measurement result are negatively correlated with the uplink transmission power.

Regarding to the apparatus in the above embodiment, a specific way in which each module performs operations has been described in detail in the embodiment of related methods, and will not be described in detail here.

For the apparatus embodiment, because it basically corresponds to the method embodiment, it is only necessary to refer to the method embodiment for the relevant part of the description. The apparatus embodiments described above are only schematic, where the modules described as separate components may or may not be physically separated, and the components displayed as modules may or may not be physical modules, that is, they may be located in one place or distributed to a plurality of network modules. Some or all of the modules can be selected according to actual needs to achieve the purpose of this embodiment. It can be understood and implemented by a person of ordinary skill in the art without creative labor.

An embodiment of the present disclosure further provides a communication apparatus, including: a processor; a memory for storing a computer program; where the self-interference avoidance method described in any of the above embodiments is implemented when the computer program is executed by the processor.

An embodiment of the present disclosure further provides a communication apparatus, including: a processor; a memory for storing a computer program; where the measurement result sending method described in any of the above embodiments is implemented when the computer program is executed by the processor.

An embodiment of the present disclosure further provides a computer-readable storage medium for storing a computer program, which, when executed by a processor, realizes the steps in the self-interference avoidance method described in any of the above embodiments.

An embodiment of the present disclosure further provides a computer-readable storage medium for storing a computer program, which, when executed by a processor, realizes the steps in the measurement result sending method described in any of the above embodiments.

Figure 16:
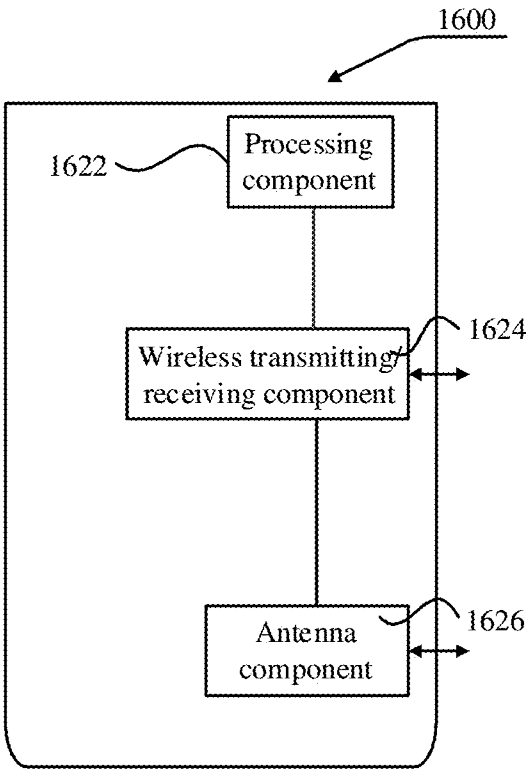
FIG. 16 is a schematic block diagram of an apparatus for self-interference avoidance according to an embodiment of the present disclosure.

As shown in FIG. 16, FIG. 16 is a schematic block diagram of an apparatus 1600 for self-interference avoidance according to an embodiment of the present disclosure. The apparatus 1600 may be provided as a base station. Referring to FIG. 16, the apparatus 1600 includes a processing component 1622, a wireless transmitting/receiving component 1624, an antenna component 1626, and a signal processing part unique to a wireless interface, and the processing component 1622 may further include one or more processors. One of the processors in the processing component 1622 may be configured to implement the self-interference avoidance method described in any of the above embodiments.

Figure 17:
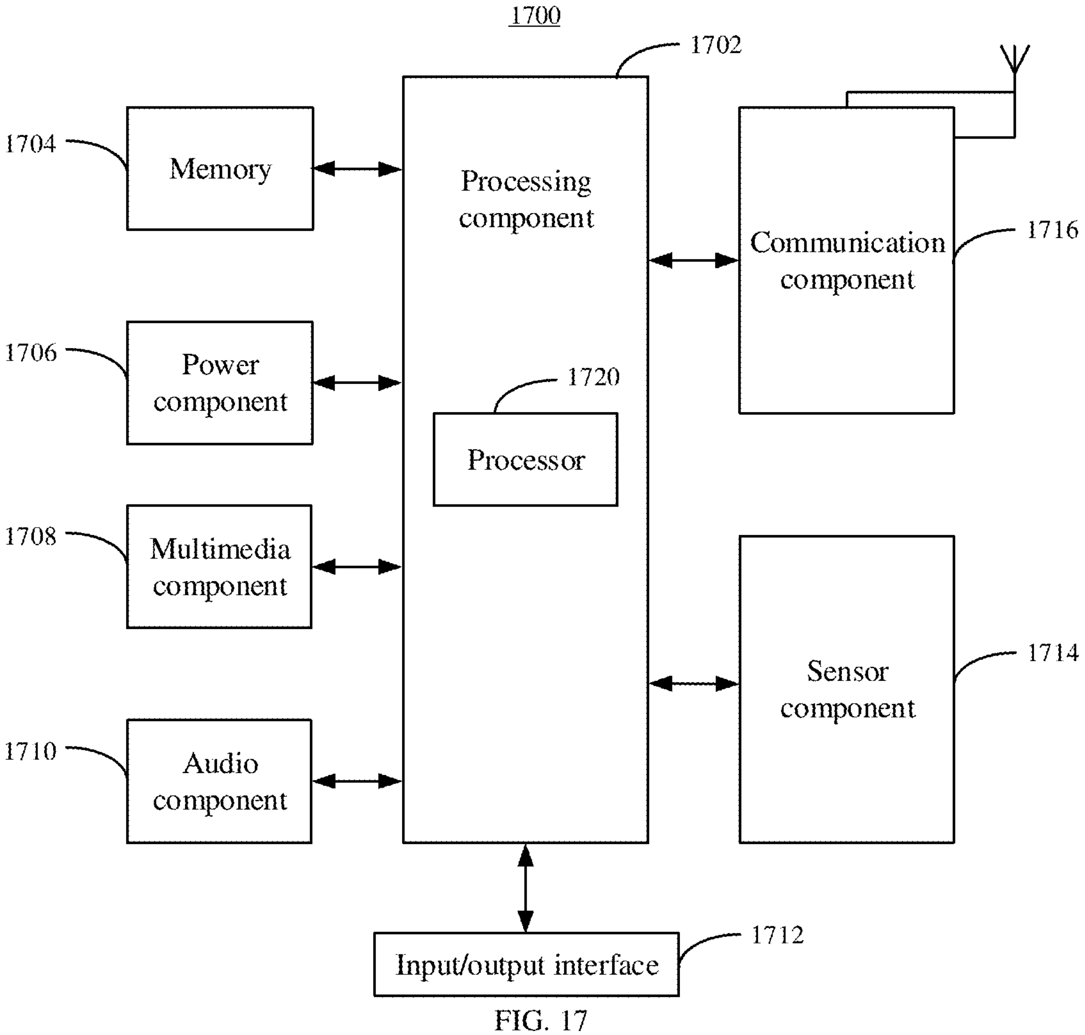
FIG. 17 is a schematic block diagram of an apparatus for sending a measurement result according to an embodiment of the present disclosure.

FIG. 17 is a schematic block diagram of an apparatus 1700 for sending a measurement result according to an embodiment of the present disclosure. For example, the apparatus 1700 may be a mobile phone, a computer, a digital broadcasting terminal, a messaging device, a game console, a tablet device, a medical device, a fitness device, a personal digital assistant, etc.

Referring to FIG. 17, the apparatus 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 generally controls the overall operation of the apparatus 1700, such as operations associated with display, telephone call, data communication, camera operation and recording operation. The processing component 1702 may include one or more processors 1720 to execute instructions to complete all or part of steps of the measurement result sending method. In addition, the processing component 1702 may include one or more modules to facilitate interactions between the processing component 1702 and other components. For example, the processing component 1702 may include a multimedia module to facilitate interactions between the multimedia component 1708 and the processing component 1702.

The memory 1704 is configured to store various types of data to support operations in the apparatus 1700. Examples of these data include instructions of any application program or method for being operated on the apparatus 1700, contact data, phone book data, messages, pictures, videos, etc. The memory 1704 can be implemented by any type of volatile or non-volatile memory device or combinations thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 1706 provides power to various components of the apparatus 1700. The power component 1706 may include a power management system, one or more power supplies, and other components associated with generating, managing and distributing power for the apparatus 1700.

The multimedia component 1708 includes a screen that provides an output interface between the apparatus 1700 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touching, sliding and gestures on the touch panel. The touch sensor may not only sense a boundary of a touching or sliding action, but also detect a duration and a pressure related to the touching or sliding operation. In some embodiments, the multimedia component 1708 includes a front camera and/or a rear camera. When the apparatus 1700 is in an operation mode, such as a shooting mode or a video mode, the front camera and/or the rear camera can receive external multimedia data. Each front camera and rear camera may be a fixed optical lens system or have focal length and optical zoom capability.

The audio component 1710 is configured to output and/or input audio signals. For example, the audio component 1710 includes a microphone (MIC) configured to receive external audio signals when the apparatus 1700 is in the operation mode, such as a calling mode, a recording mode and a voice recognition mode. The received audio signal may be further stored in the memory 1704 or transmitted via the communication component 1716. In some embodiments, the audio component 1710 further includes a speaker for outputting audio signals.

The I/O interface 1712 provides an interface between the processing component 1702 and peripheral interface modules, where the peripheral interface modules may be keyboards, click-wheels, buttons, etc. These buttons may include, but are not limited to: home button, volume button, start button and lock button.

The sensor component 1714 includes one or more sensors for providing various aspects of state evaluation for the apparatus 1700. For example, the sensor component 1714 can detect an on/off state of the apparatus 1700, a relative positioning of components, for example, the components are the display and the keypad of the apparatus 1700, and the sensor component 1714 can also detect a position change of the apparatus 1700 or a component of the apparatus 1700, presence or absence of user contact with the apparatus 1700, orientation or acceleration/deceleration of the apparatus 1700 and a temperature change of the apparatus 1700. The sensor component 1714 may include a proximity sensor configured to detect presence of a nearby object without any physical contact. The sensor component 1714 may also include an optical sensor, such as a CMOS or CCD image sensor, for use in imaging applications. In some embodiments, the sensor component 1714 may further include an acceleration sensor, a gyroscope sensor, a magnetic sensor, a pressure sensor or a temperature sensor.

The communication component 1716 is configured to facilitate wired or wireless communication between the apparatus 1700 and other devices. The apparatus 1700 can access a wireless network based on communication standards, such as WiFi, 2G, 3G, 4G LTE, 5G NR, or combinations thereof. In an embodiment, the communication component 1716 receives a broadcast signal or broadcast related information from an external broadcast management system via a broadcast channel. In an embodiment, the communication component 1716 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the apparatus 1700 may be implemented by one or more application-specific integrated circuits (ASIC), digital signal processors (DSP), digital signal processing devices (DSPD), programmable logic devices (PLD), field programmable gate arrays (FPGA), controllers, micro-controllers, micro-processors or other electronic components, for executing the above-mentioned measurement result sending method.

In an embodiment, a non-transitory computer-readable storage medium is further provided, such as the memory 1704 including instructions, where the instructions can be executed by a processor 1720 of the apparatus 1700 to complete the above-mentioned measurement result sending method. For example, the non-transitory computer-readable storage medium may be an ROM, a random access memory (RAM), a CD-ROM, a magnetic tape, a floppy disk, an optical data storage device, etc.

Other embodiments of the present disclosure will easily occur to those skilled in the art after considering the specification and practicing the disclosure disclosed herein. The present disclosure is intended to cover any variations, uses or adaptations of the present disclosure, and these variations, uses or adaptations follow general principles of the present disclosure and include common sense or common technical means in the technical field that are not disclosed in the present disclosure. The specification and embodiments are to be regarded as examples only, and true scope and spirit of the present disclosure are indicated by the following claims.

It should be understood that the present disclosure is not limited to precise structures described above and shown in the accompanying drawings, and various modifications and changes can be made without departing from its scope. The scope of the present disclosure is limited only by the appended claims.

It should be noted that, relational terms here such as first and second are only used to distinguish one entity or operation from another entity or operation, and do not necessarily require or imply that there is any such actual relationship or order between these entities or operations. Terms "including", "containing" or any other variations thereof are intended to cover non-exclusive inclusion, so that a process, method, object or device including a series of elements not only includes those elements, but also includes other elements not explicitly listed or elements inherent to such process, method, object or device. Without further limitations, an element defined by the phrase "including one" does not exclude the existence of other identical elements in the process, method, object or device including the element.

The methods and apparatuses of the present disclosure are described above in detail. The principle and implementation of the present disclosure are described herein through specific examples. The description about the embodiments of the present disclosure is merely provided for ease of understanding of the method and core ideas of the present disclosure. Persons of ordinary skill in the art can make variations and modifications to the present disclosure in terms of the specific implementations and application scopes according to the ideas of the present disclosure. Therefore, the specification shall not be construed as a limit to the present disclosure.

The invention claimed is:

1. A self-interference avoidance method, performed by a network side device, comprising:

determining a carrier combination with potential self-interference, wherein the carrier combination comprises a first carrier subjected to interference and a second carrier causing interference;

sending a downlink reference signal on the first carrier;

instructing a terminal to change uplink transmission power on the second carrier;

receiving a first measurement result and a second measurement result reported by the terminal, wherein the first measurement result comprises a measurement result determined by the terminal by measuring the downlink reference signal before changing the uplink transmission power, and the second measurement result comprises a measurement result determined by measuring the downlink reference signal after changing the uplink transmission power; and determining whether to perform self-interference avoidance according to the first measurement result and the second measurement result.

2. The method according to claim 1, wherein before sending the downlink reference signal on the first carrier, the method further comprises:

sending a configuration of the downlink reference signal to the terminal.

3. The method according to claim 2, wherein sending a configuration of the downlink reference signal to the terminal comprises:

sending the configuration of the downlink reference signal to the terminal in response to the terminal being capable of determining and reporting the first measurement result and the second measurement result.

4. The method according to claim 1, wherein performing self-interference avoidance comprises at least one of:

instructing the terminal to communicate on a second carrier combination other than the carrier combination;

instructing the terminal that a configuration of the carrier combination is cancelled;

instructing the terminal to reduce the uplink transmission power on the second carrier; or increasing downlink transmission power on the first carrier.

5. The method according to claim 1, wherein determining whether to perform self-interference avoidance according to the first measurement result and the second measurement result comprises:

determining whether to perform the self-interference avoidance according to a difference between the second measurement result and the first measurement result.

6. The method according to claim 5, wherein determining whether to perform the self-interference avoidance according to a difference between the second measurement result and the first measurement result comprises:

performing the self-interference avoidance when the difference is greater than a first threshold.

7. The method according to claim 5, wherein the first measurement result comprises a first received signal strength indication (RSSI), and the second measurement result comprises a second RSSI; or the first measurement result comprises a first reference signal receiving quality (RSRQ), and the second measurement result comprises a second RSRQ.

8. The method according to claim 1, wherein determining whether to perform self-interference avoidance according to the first measurement result and the second measurement result comprises:

performing the self-interference avoidance in response to receiving the first measurement result and the second measurement result.

9. The method according to claim 8, wherein the first measurement result and the second measurement result respectively comprise at least one of:

a difference between RSSI and reference signal receiving power (RSRP); or an RSRQ.

10. A measurement result sending method, performed by a terminal, comprising:

receiving a downlink reference signal on a first carrier configured in a carrier combination by a network side device;

changing uplink transmission power on a second carrier in the carrier combination according to an instruction of the network side device;

determining a first measurement result by measuring the downlink reference signal before changing the uplink transmission power, and determining a second measurement result by measuring the downlink reference signal after changing the uplink transmission power; and sending the first measurement result and the second measurement result to the network side device.

11. The method according to claim 10, wherein before receiving the downlink reference signal on the first carrier, the method further comprises:

receiving a configuration of the downlink reference signal sent by the network side device.

12. The method according to claim 11, wherein before receiving the configuration of the downlink reference signal sent by the network side device, the method further comprises:

sending capability indication information to the network side device, wherein the capability indication information indicates whether the terminal has the capability to determine and report the first measurement result and the second measurement result.

13. The method according to claim 10, wherein sending the first measurement result and the second measurement result to the network side device comprises:

sending the first measurement result and the second measurement result to the network side device; or, sending a difference between the second measurement result and the first measurement result to the network side device.

14. The method according to claim 13, wherein the first measurement result comprises a first received signal strength indication (RSSI), and the second measurement result comprises a second RSSI; or the first measurement result comprises a first reference signal receiving quality (RSRQ), and the second measurement result comprises a second RSRQ.

15. The method according to claim 10, wherein sending the first measurement result and the second measurement result to the network side device comprises:

determining a correlation between the first measurement result and the second measurement result with the uplink transmission power; and sending the first measurement result and the second measurement result to the network side device when the correlation satisfies a preset relationship.

16. The method according to claim 15, wherein sending the first measurement result and the second measurement result to the network side device when the correlation satisfies a preset relationship comprises:

sending the first measurement result and the second measurement result to the network side device when the correlation satisfies a preset relationship and a difference between RSSI and RSRP determined by measuring the downlink reference signal is greater than a reference threshold, wherein the first measurement result comprises a first difference between the RSSI and the RSRP determined according to the downlink reference signal before changing the uplink transmission power, and the second measurement result comprises a second difference between the RSSI and the RSRP determined according to the downlink reference signal after changing the uplink transmission power; or, sending the first measurement result and the second measurement result to the network side device when the RSRQ determined by measuring the downlink reference signal is less than a set threshold, wherein the first measurement result comprises a third RSRQ determined by measuring the downlink reference signal before changing the uplink transmission power, and the second measurement result comprises a fourth RSRQ determined by measuring the downlink reference signal after changing the uplink transmission power.

17. The method according to claim 15, wherein the first measurement result comprises a first difference between RSSI and RSRP determined according to the downlink reference signal before changing the uplink transmission power, the second measurement result comprises a second difference between RSSI and RSRP determined according to the downlink reference signal after changing the uplink transmission power, and the preset relationship is a positive correlation;

determining a correlation between the first measurement result and the second measurement result with the uplink transmission power comprises:

when reducing the uplink transmission power, in response to determining that the first difference is greater than the second difference, determining that the first measurement result and second measurement result are positively correlated with the uplink transmission power; and when increasing the uplink transmission power, in response to determining that the first difference is less than the second difference, determining that the first measurement result and second measurement result are positively correlated with the uplink transmission power.

18. The method according to claim 15, wherein the first measurement result comprises a third RSRQ determined by measuring the downlink reference signal before changing the uplink transmission power, and the second measurement result comprises a fourth RSRQ determined by measuring the downlink reference signal after changing the uplink transmission power, and the preset relationship is a negative correlation;

determining a correlation between the first measurement result and the second measurement result with the uplink transmission power comprises:

when reducing the uplink transmission power, in response to determining that the third RSRQ is less than the fourth RSRQ, determining that the first measurement result and second measurement result are negatively correlated with the uplink transmission power; and when increasing the uplink transmission power, in response to determining that the third RSRQ is greater than the fourth RSRQ, determining that the first measurement result and second measurement result are negatively correlated with the uplink transmission power.

19. A communication apparatus, comprising:

a processor; and a memory for storing a computer program executable by the processor;

wherein the processor is configured to:

determine a carrier combination with potential self-interference, wherein the carrier combination comprises a first carrier subjected to interference and a second carrier causing interference;

send a downlink reference signal on the first carrier;

instruct a terminal to change uplink transmission power on the second carrier;

receive a first measurement result and a second measurement result reported by the terminal, wherein the first measurement result comprises a measurement result determined by the terminal by measuring the downlink reference signal before changing the uplink transmission power, and the second measurement result comprises a measurement result determined by measuring the downlink reference signal after changing the uplink transmission power; and determine whether to perform self-interference avoidance according to the first measurement result and the second measurement result.

20. A communication apparatus, comprising:

a processor; and a memory for storing a computer program executable by the processor;

wherein the processor is configured to perform the measurement result sending method according to claim 10.

* * * * *